United States Patent
Martin et al.

(10) Patent No.: US 11,631,003 B2
(45) Date of Patent: Apr. 18, 2023

(54) PREDICTING FAILURES WITH CODE FLOW TENSORS

(71) Applicant: EMC IP Holding Company LLC, Hopkinton, MA (US)

(72) Inventors: Owen Martin, Hopedale, MA (US); Benjamin A. Randolph, Uxbridge, MA (US); Scott J. Romano, Ashland, MA (US); Hani Zaitoun, Northbridge, MA (US); Abhilash Sanap, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 367 days.

(21) Appl. No.: 16/916,735

(22) Filed: Jun. 30, 2020

(65) Prior Publication Data

US 2021/0406678 A1  Dec. 30, 2021

(51) Int. Cl.
*G06T 7/00* (2017.01)
*G06N 3/08* (2023.01)
*G06K 9/62* (2022.01)
*G06N 7/00* (2023.01)
*G06N 3/04* (2023.01)
*G06F 8/41* (2018.01)

(52) U.S. Cl.
CPC .............. *G06N 3/08* (2013.01); *G06F 8/433* (2013.01); *G06K 9/6256* (2013.01); *G06N 3/0454* (2013.01); *G06N 7/005* (2013.01); *G06T 7/0002* (2013.01); *G06T 2207/10024* (2013.01); *G06T 2207/20081* (2013.01)

(58) Field of Classification Search
None
See application file for complete search history.

(56) References Cited

U.S. PATENT DOCUMENTS

| 10,372,556 B1* | 8/2019 | Baruch | G06F 11/1088 |
| 2011/0141118 A1* | 6/2011 | Cardno | G06T 11/001 |
| | | | 345/441 |
| 2020/0301739 A1* | 9/2020 | Xu | G06N 3/063 |

OTHER PUBLICATIONS

Gupta, Ankita, Gurunath Gurrala, and P. S. Sastry. "An online power system stability monitoring system using convolutional neural networks." IEEE Transactions on Power Systems 34.2 (2018): 864-872. (Year: 2018).*

* cited by examiner

Primary Examiner — Sean M Conner
(74) Attorney, Agent, or Firm — Muirhead and Saturnelli, LLC

(57) ABSTRACT

Techniques for predicting states may include: receiving data sets of counter values, wherein each counter values denotes a number of times a particular code flow point associated with the counter value is executed at runtime during a specified time period; receiving images generated from the data sets; labeling each of the images with state information, wherein first state information associated with a first image indicates that the first image is associated with a first error state of a system or an application; training a neural network using the images to recognize the first state; receiving a next image generated from another data set; and predicting, by the neural network and in accordance with the next image, whether the system or the application is expected to transition into the first state. In at least one embodiment, the foregoing processing may optionally use matrices generated from the data sets rather than images.

19 Claims, 14 Drawing Sheets

PREDICTING FAILURES WITH CODE FLOW TENSORS

BACKGROUND

Technical Field

This application generally relates to techniques used for predicting events, such as failures, in a system.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, a host may perform I/O operations such as data read and write operations sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of the techniques herein, a method, a system and a computer readable medium may be used to predict states comprising: receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period; receiving a plurality of images generated from the plurality of data sets, wherein each of the plurality of data sets is used to generate a different one of the plurality of images; labeling each of the plurality of images with state information, wherein first state information associated with a first image of the plurality of images indicates that the first image is associated with a first error state of a system or an application; training a neural network using the plurality of images, wherein said training includes training the neural network to recognize the first state; subsequent to said training, receiving a next image generated from another data set including a plurality of counter values each denoting a number of times a particular code flow point associated with said each counter value is executed at runtime; and predicting, by the neural network and in accordance with the next image, whether the system or the application is expected to transition into the first state. Processing may include: providing the next image as an input to the neural network; and responsive to providing the next image as an input to the neural network, generating by the neural network, a first output value corresponding to a probability indicating a likelihood that the system or the application subsequently transitions into the first state. Processing may also include determining whether the first output value is greater than a threshold; and responsive to determining the first output value is greater than the threshold, predicting that the system or the application is expected to transition into the first state, and otherwise predicting that the system or the application is not expected to transition into the first state.

In at least one embodiment, the first state information, that is associated with a first image, may include a time interval denoting a first amount of time prior to the first error state, and wherein the first image may be generated from a first data set acquired the first amount of time prior to an occurrence of the first error state in the system or the application. The first image may be generated from a first of the plurality of data sets and the method may further comprise: receiving the first data set; waiting a specified amount of time for an occurrence of one of a plurality of defined error states, wherein the first error state is included in the plurality of defined error states; receiving notification regarding a first occurrence of the first error state at a first point in time, wherein the first data set is acquired the first amount of time prior to the first occurrence of the first error state in the system or the application; and responsive to said notification, labeling the first data set and the first image with the first state information. Each of the plurality of images may be a gray scale image. Each of the plurality of images may be a color image denoting a heat map of counter values included in a particular one of the plurality of data sets used to generate said each image.

In at least one embodiment, 8 the neural network may be a first neural network that is assigned an active role at a first point in time, and wherein a second neural network may be assigned an idle role at the first point in time. The active role assigned to the first neural network may indicate the assigned first neural network is in a non-learning mode and the first neural network may be used to predict a subsequent state of the system or the application based on newly acquired data sets, and wherein the idle role assigned to the second neural network may indicate the second neural network is in a learning mode and the newly acquired data sets may be used to generate first images used to train the second neural network. The second neural network that is assigned the idle role and that is in the learning mode may have one or more internal weights adjusted responsive to receiving at least some of the first images as input. At a second point in time subsequent to the first point in time, the first neural network may transition from the active role to the idle role indicating that the first neural network is in the learning mode, and wherein at the second point in time, the second neural network may transition from the idle role to the active role and indicates that the second neural network is in the non-learning mode. Subsequent to the second point in time, the second neural network may be used to predict a subsequent state of the system or the application based on second newly acquired data sets, and wherein subsequent to the second point in time, the second newly acquired data sets may be used to generate second images used to train the first neural network. While the first neural network is assigned the idle role and is in the learning mode, the first neural network may have one or more internal weights adjusted responsive to receiving at least some of the second images as input.

In at least one embodiment, the system may be a data storage system. Each of the plurality of data sets may be acquired at a different point in time. The first image may be generated from a first data set of the plurality of data sets. The first image may be correlated with the first error state and the first image may include pixels representing the plurality of counter values of the first data set. The first image may be included in a first time sequence of images corresponding to states of the system or the application at different time intervals prior to the system or the application transitioning into the first error state.

In accordance with one aspect of the techniques herein, a method, a system and a computer readable medium may be used to predict states comprising: receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period; receiving a plurality of matrices generated from the plurality of data sets, wherein each of the plurality of data sets is used to generate a different one of the plurality of matrices; labeling each of the plurality of matrices with state information, wherein first state information associated with a first matrix of the plurality of matrices indicates that the first matrix is associated with a first error state of a system or an application; training a neural network using the plurality of matrices, wherein said training includes training the neural network to recognize the first state; subsequent to said training, receiving a next matrix generated from another data set including a plurality of counter values each denoting a number of times a particular code flow point associated with said each counter value is executed at runtime; and predicting, by the neural network and in accordance with the next matrix, whether the system or the application is expected to transition into the first state.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
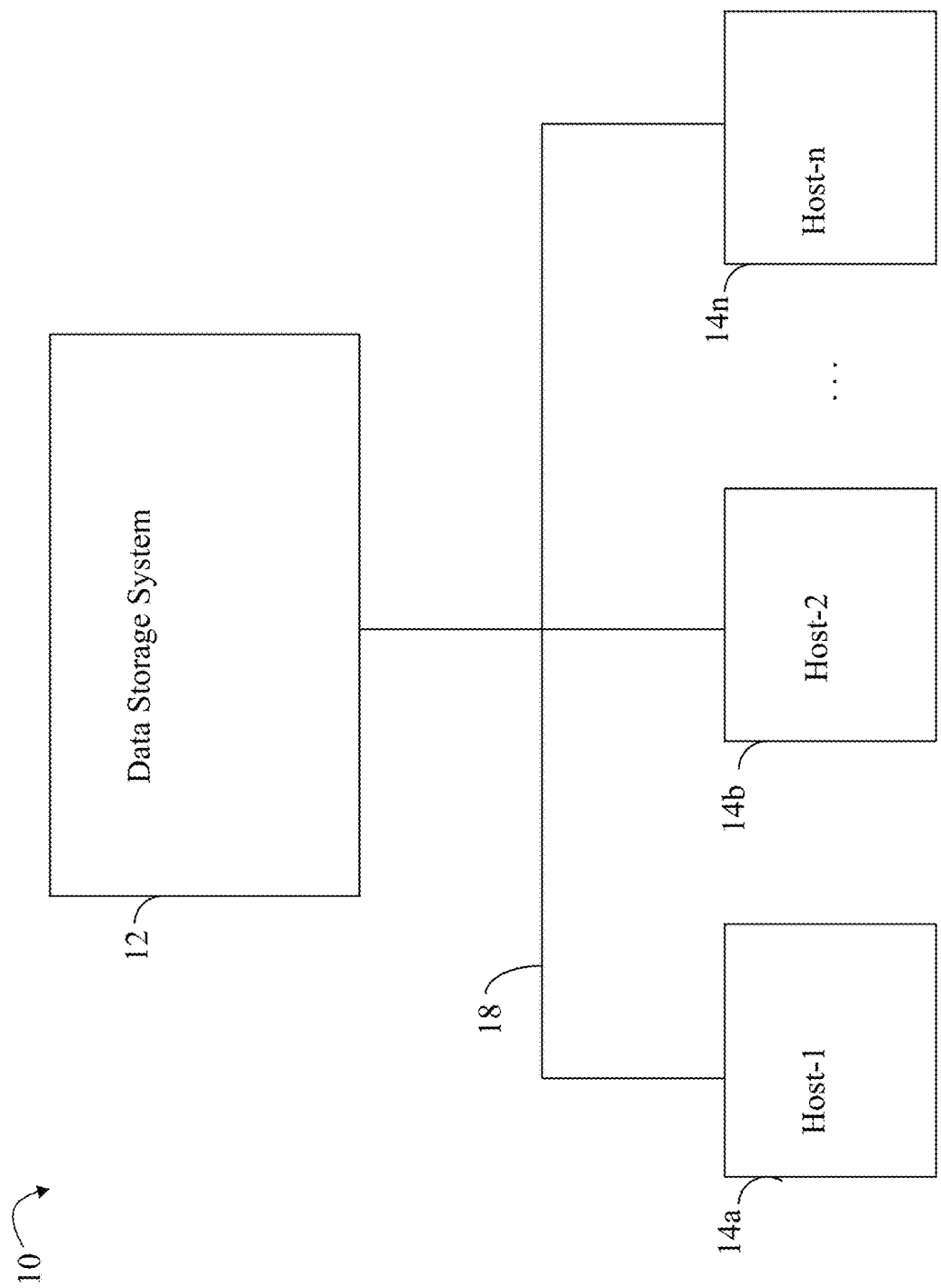
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system 12 may all be located at the same physical site, or, alternatively, may also be located in different physical locations. The communication medium 18 that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, Infiniband (IB), and the like. Some or all of the connections by which the hosts and the data storage system 12 may be connected to the communication medium 18 may pass through other communication devices as well as other switching equipment that may exist such as a phone line, a repeater, a multiplexer or even a satellite.

Each of the host computer systems may include one or more applications that perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
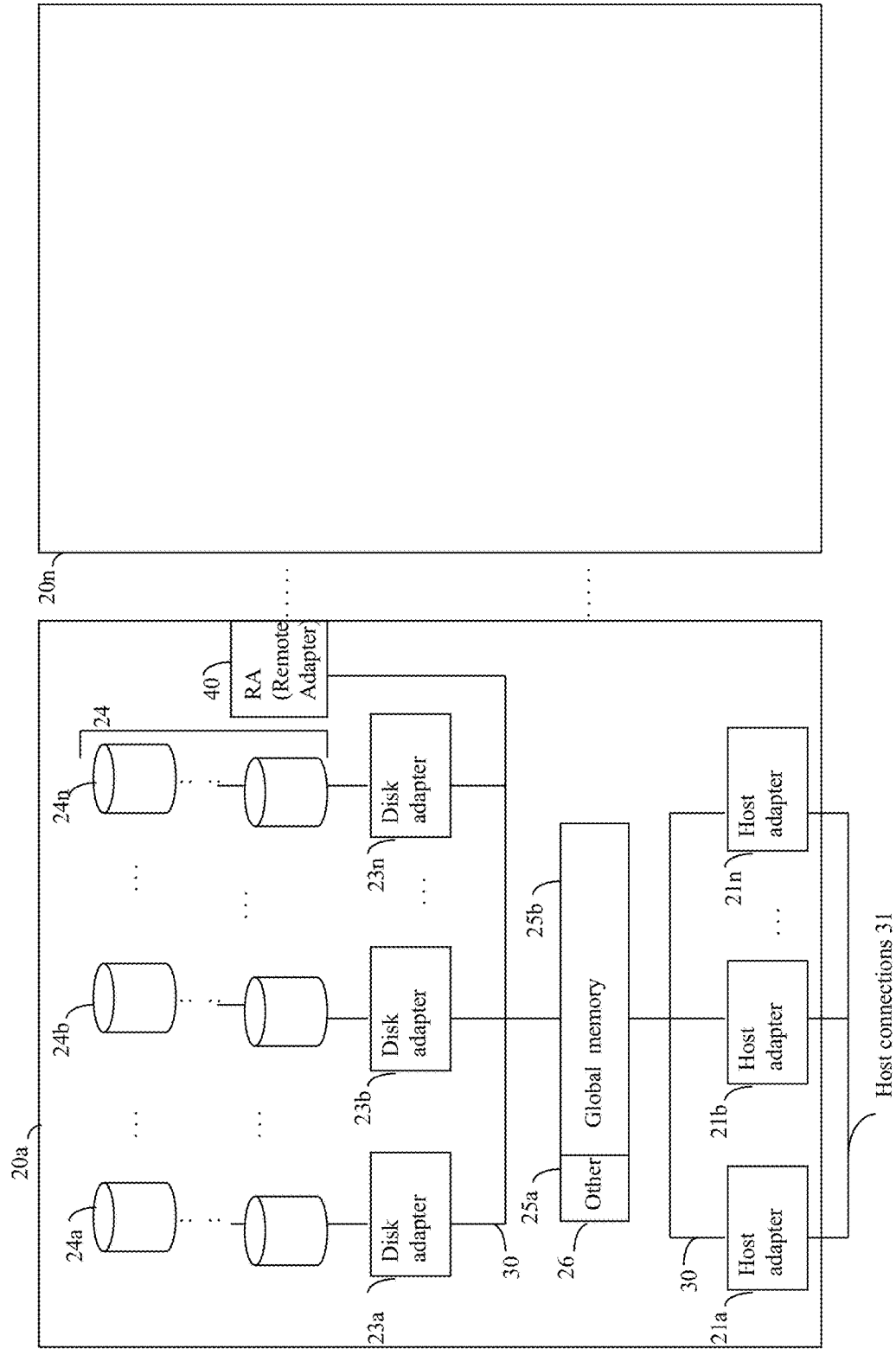
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, the physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, the directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. DAs may be characterized as backend components of the data storage system. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units of storage. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers, for example, in connection with the SCSI standard. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

As noted above, the DAs of the data storage system may be characterized as backend components of the data storage systems. The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
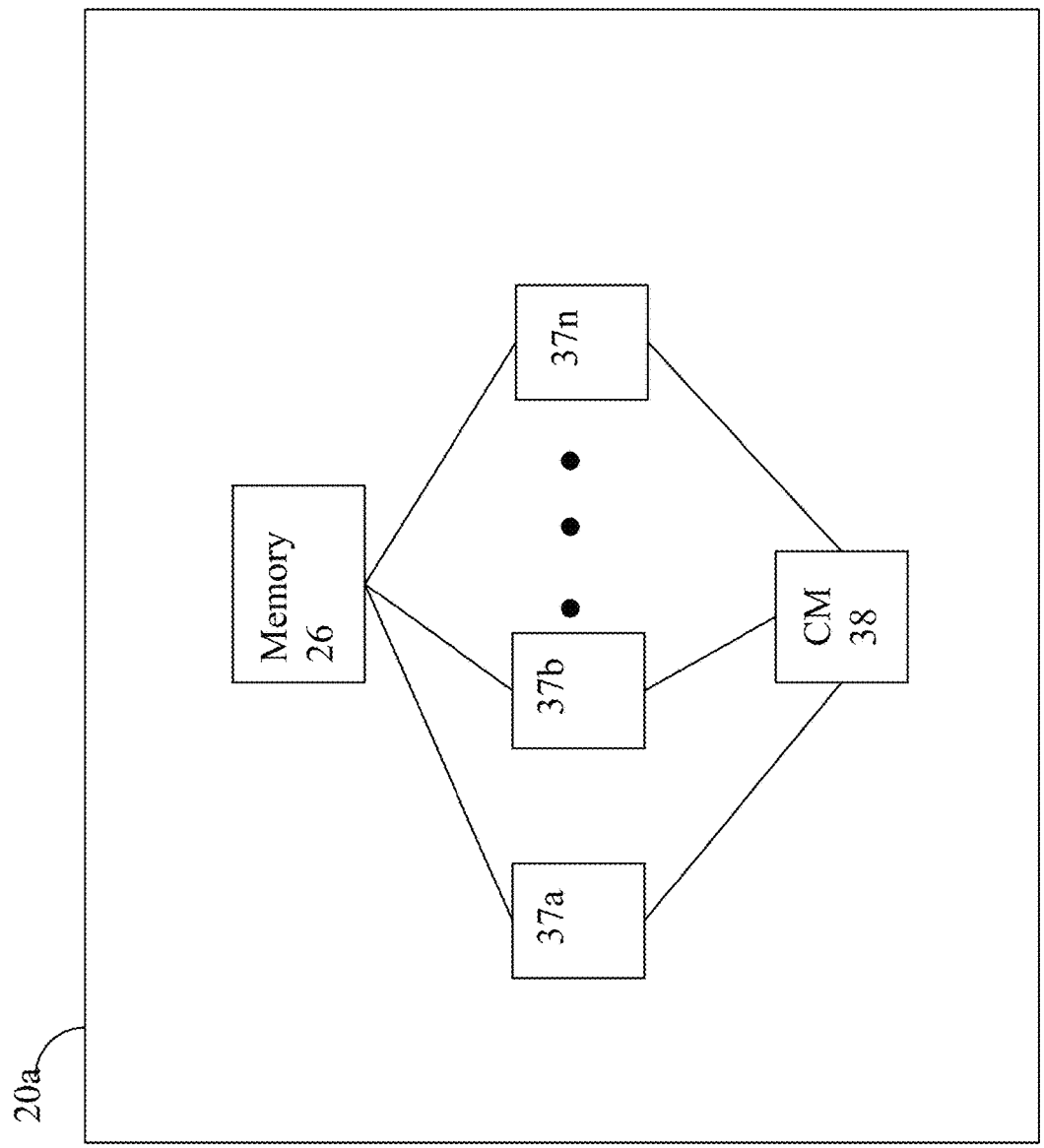
FIG. 2B is a representation of the logical internal communications between the directors and memory included in one embodiment of data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device, volume or other logical storage unit such as denoted by a LUN or other storage entity that may vary with the system and protocol. For example, in the NVMe protocol, a namespace may denote a logical storage unit, volume or device. Thus, although discussion herein may sometimes refer to a LUN, more generally, use of such the term LUN may more generally denote a logical storage unit volume or device that may have a different corresponding term for the storage entity, such as a namespace, in another protocol, such as NVMe. In discussion herein where a LUN may generally denote a logical device or unit of storage on the data storage system, the same logical device or unit of storage may have different identifiers used in different contexts and protocols. For example, a logical device configured on the data storage system may be exposed as a LUN to the host over a first path using the SCSI protocol. The LUN on the first path may be associated with an identifier, such as a world wide unique name (WWN) used in connection with the SCSI protocol of the first path. The same logical device may be exposed as a namespace to the host over a second path using the NVMe protocol. The LUN on the second path may be associated with a different identifier, such as a namespace globally unique identifier (GUID), used in connection with the NVMe protocol of the second path. As known in the art, a namespace in the NVMe protocol is storage formatted for block access and is analogous to a logical device or LUN in SCSI.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Applications that execute in existing systems may be larger and complex. For such applications, debugging may be difficult. Additionally, predicting risk of failure of such applications may also be difficult.

Described below are techniques that may be used to facilitate providing a risk assessment based on failure of observed code flow tensors, sometimes referred to herein as tensors.

In at least one embodiment, the tensors may be implemented as a vector of counters where particular ones of the counters are incremented when code is executed on various runtime code paths during execution of an application.

In at least one embodiment, the output of the tensors denoting the particular counter values may be collected and correlated with errors or other events that occur over time to generate a risk factor for experiencing the error, failure, or other event. Different sets or collections of counter values may be correlated to different errors or events. The foregoing may be provided as input to a model that may be used to learn and predict when an application or system will fail or, more generally, experience particular events such as failures.

In at least one embodiment, the application may be written to increment one or more particular counters on different code paths as such code paths are executed at run time during execution of the application. The code paths may include, for example, unexpected code paths (e.g., code paths executed conditionally but under conditions that have a low probability of occurrence, such as below a specified threshold level), code paths executed when there is an error, code paths executed when there are repeated attempts to perform a task or operation such as due to unsuccessful prior attempts, normal or successful code paths, and the like. The application developer may identify such code paths and use any suitable mechanism to increment one or more code flow tensors at various points during application execution or runtime on the code paths. For example, in at least one embodiment, each code flow tensor may be associated with a different or unique execution or code flow point in an application's runtime execution. Thus, at a particular point in time during execution of the application, multiple code flow tensors or counters may have different counter values depending on the particular code paths executed in the application up to the particular point in time.

In at least one embodiment, the counter values collected at a particular time and included in a single collection or sample may be represented as a matrix or two dimensional array. Each row of the matrix may correspond to a different portion or subset of the counter values acquired at the particular time associated with the matrix. Each entry or cell of the matrix is a counter value for a particular counter denoted by the row and column indices of the entry. For example, row I, col J of the matrix may denote the entry of a particular counter value acquired in a single collection or sample. In at least one embodiment, a set of counter values included in a matrix may be collected daily. The counter values may be collected from multiple systems periodically, such as on a daily basis. In this case, there may be a different matrix of counter values for each system for each time or sample period. Since the counter values may vary in range, in at least one embodiment, the counter values may be normalized. For example, the counter values may be normalized to a rate per day. For example, there may be 10 systems for which data sets are acquired on a daily basis, whereby 10 data sets are acquired per day. Each of the 10 data sets may be include counter values that are normalized as a rate per day and then placed in the form of a matrix as described above and elsewhere herein. Thus, the 10 data sets result in 10 matrices of counter values.

Additionally, the occurrence of error conditions or other events of interest may be logged. For each occurrence, information may be recorded in an entry of the log. The entry recorded for a particular error or event occurrence may include, for example, the system on which the error or event occurred, the date and time of the error or event, an error or event code, and other information about the error or event. Each error condition or other event logged may be associated or correlated with a particular sample set or single collection (e.g., matrix) of counter values. In at least one embodiment, an error occurrence having an entry in the log may be correlated or associated with the sample set of counter values that are most recently acquired prior to the error. For example, if a new collection or sample of counter values is acquired at 1 p.m. each day and an error occurs at 3 p.m., the error is associated with the sample of counter values acquired at 1 p.m. on the same day as the error occurrence. As another example, if a new collection or sample of counter values is acquired at 1 p.m. each day and an error occurs at 11 a.m. on Tuesday, the error is associated with the sample of counter values acquired at 1 p.m. on the Monday, the day prior to the error since the sample of counter values has not yet been acquired for Tuesday.

In some embodiments, each matrix denoting a collection of counter values may be represented as, or converted to, an image. Generally, the image may be any suitable image file such as a gray scale image or a color image for a heat map. In at least one embodiment, each matrix denoting a collection of counter values may be represented as a two dimensional heat map. The heat map may be represented as a two dimensional image where each pixel of the heat map has an intensity based on the counter value at a particular row and column of the matrix. A heatmap may have an associated label indicating an associated or correlated state. A heatmap may have an associated state of none or non-error by default each time a new sample set of counter values is acquired. Once an error occurs, the most recently acquired prior sample or matrix of counter values may be associated or correlated with the particular error and labeled accordingly. More generally, a heatmap or other image may be labeled with any errors that occur subsequent to when the heatmap image is obtained but also prior to acquiring the next sample and thus next heatmap image.

In some embodiments, more than one prior matrix or sample of counter values may be labeled to indicate both the error as well as an amount of time or duration prior to the error condition occurrence. In this manner, multiple heat maps represented as images may be used to visually illustrate the state of the counters in a progression over time prior to the error occurring. For example, assume a new collection or sample of counter values is acquired at 1 p.m. each day and an error occurs at 3 p.m. on Wednesday. A first sample of counter values may be labeled to denote the state of the counters for the error on the same day or 2 hours prior to the error occurrence; a second sample of counter values may be labeled to denote the state of the counters for the error on Tuesday or 1 day prior to the error occurrence; and a third sample of counter values may be labeled to denote the state of the counters for the error on Monday or 2 days prior to the error occurrence.

In at least one embodiment, the techniques described herein may be used to predict various errors in connection with a data storage system or an application executing on the system. Prior to an error occurring, various code paths such as related to retrying a particular task or operation may be traversed at runtime. During the execution of such code paths, the various counters in the code paths are incremented.

Subsequently, the error occurs and the counter values at the time of the error occurrence may be associated or correlated with the particular error. The counter values denote the error condition or error state. For example, a set of counters may have values that are incremented prior to the occurrence of the error where the set of counters may be incremented on code paths associated with multiple failed attempts at retrying the particular task. As a result, an observed increase in the set of counters may be an indicator or predictor of the subsequent error.

In at least one embodiment, the matrices or images may be used to train a model. In at least one embodiment in which the matrices are converted to labeled heatmap images, the labeled heatmap images may be used to train a model, such as a convolution neural network (CNN). The CNN may be trained to recognize and predict the different errors indicated by the different heatmap images. In at least one embodiment in which the matrices are not converted to images, the matrices may be used to train one or more CNNs to recognize and predict the different errors indicated by the different matrices. CNNs, and use of CNNs with the techniques herein, are described in more detail elsewhere herein.

The following paragraphs and description may provide examples for purposes of illustration in which CNNs are trained using images generated from the matrices, where such images are heatmap images or other suitable images. More generally, the techniques herein may include training the CNNs using the matrices rather than images generated from the matrices. In such an embodiment, processing may be performed that optionally omits converting the matrices to corresponding images.

To adapt to constant changes in the code and systems, an embodiment may utilize continuous training techniques. In at least one embodiment, a first CNN may be trained and used as the active CNN for prediction and recognition. Once the first CNN is trained, it may be placed in non-training or non-learning mode where its weights are not adjusted. A second CNN may also be trained and remain in training mode as new additional data is acquired. The second CNN may have an offline, passive or idle role with respect to use for prediction and recognition. Thus, the second CNN may continue to be trained while the first CNN is not in training mode but while the first CNN is used for prediction, inference and recognition. After a time period, the roles of the first CNN and the second CNN may be swapped. In other words, the first CNN may assume the offline, idle or passive role and may be placed in learning mode to further train with subsequent new data, and the second CNN may assume the online or active role and may be placed in non-learning or non-training mode. The active first CNN may be online and used for predicting whether a new heatmap image indicates an error condition will occur, and the idle, offline second CNN may continue to be trained based on additional acquired new heatmap images. At various points in time, the roles of the first CNN and the second CNN may be repeatedly and continuously swapped. For example in at least one embodiment, the roles of the first CNN and the second CNN may be swapped every month or other suitable time period.

In at least one embodiment, to provide a baseline to start, samples of acquired data may be partitioned into two sets—a training set and a testing set. For example, the testing set may include samples acquired in the most recent 3 months and the training set may include all other acquired data samples. Once an active CNN is trained, processing may performed to then train the idle CNN using all the data in both the training and testing sets. Additionally, the idle CNN remains in learning or training mode where its weights are adjusted as it is further trained using newly acquired data samples. However, the active CNN is placed in non-training or non-learning mode where its weights are not adjusted. Rather, the active CNN may be used to predict or infer the probability of an error occurring with respect to the new heatmap images based on the newly acquired data samples. For example, each time a new sample is acquired, a new heatmap image may be generated and provided as input to the active CNN. The active CNN may generate an output, such as a real number in the inclusive range of 0.0 through 1.0, denoting a percentage regarding the occurrence of an error. For example, 0.0. may denote 0%, and 1.0 may denote 100%, with other values between 0.0 and 1.0 denoting a percentage based on linear scaling (e.g., 0.50 denotes 50%). If the predicted percentage generated by the active CNN is above a specified threshold, proactive measures may be taken to possibly avoid the error or failure predicted. If the predicted percentage is not above the specified threshold, the new heatmap image may be held for a specified amount of time, such as 7 days, to observe whether the error actually does occur in the specified amount of time. In other words, the new heatmap image may be held for the specified amount of time to observe whether the error occurs despite the active CNN's prediction. If the error does occur within the specified amount of time, the new heatmap image may be appropriately labeled in a manner as discussed above, where the new heatmap image is associated with the error condition and an amount of time prior to the error condition. Otherwise, if the error does not occur within the specified amount of time, the new heatmap image may be labeled as none or non-error. After the labeling of the new heatmap image after the specified amount of time, the new heatmap image may be used for further training the idle or offline CNN.

In at least one embodiment, the techniques herein may be used to predict the occurrence of errors in a data storage system, such as the occurrence of data unavailability (DU) or data loss (DL) days prior to the DU/DL event. More generally, the techniques herein may be used with any suitable system and code executing on the system to predict the occurrence of any desired event using the heatmap images generated from the code flow tensors.

In at least one embodiment where the techniques described herein are used in connection with code executed on a data storage system, the techniques herein may be used to predict the occurrence of a particular error. The error may be a "write time out error", also noted herein as a 2A2C error, where a host issues a write I/O to the data storage system and the data storage system fails to complete the write I/O within a specified time period. Generally, the data storage system may have failed or been unable to complete the write I/O received from the host for any number of reasons, such as inability to acquire a cache slot to store the write I/O data, inability to process the write I/O from a pending queue due to the high workload, and the like. As a result, the host is adversely impacted in that the write I/O has not been completed within the specified time period. The host may retry the write and, after a number of failed attempts, may timeout. In such an embodiment, a first set of heatmap images may be generated from code flow tensors associated with the write time out error, and a second set of heatmap images may be generated from code flow tensors associated with a non-error or normal system state. The first and the second sets of heatmap images may be used to train two CNNs as discussed above, where one of the CNNs is designated as the active CNN placed in non-learning or non-training mode and the other of the CNNs is designated as the idle or passive CNN that continues to learn or train based on subsequently acquired heatmap images. The active CNN predicts whether the write time out error will occur based on the subsequently acquired heatmap images.

The various heatmap images illustrate the signatures of the particular code flow tensors associated with the write time out error prior to the occurrence of the write time out error. For example, the samples of code flow tensors and generated heatmap images may be labeled with the same error, the write time out error, but with differing time periods prior to the error. In this manner, multiple heatmap images may denote a time sequence of code flow tensor signatures corresponding to the write time out error, where the time sequence occurs prior to the error. In this manner, a trained CNN may recognize when the code flow tensors exhibit heat map images corresponding to time sequence and predict the write time out error prior to its occurrence.

The foregoing and other aspects of the techniques herein are described in more detail in the following paragraphs.

Consistent with other discussion herein, code flow tensors may be implemented as counters of various execution code paths of an application, or more generally code, executed in a system. In at least one embodiment, a counter located on a particular code path is incremented at runtime when the particular code path is executed. The various code paths may be associated with processing for errors, retries, normal execution or state, and generally code paths associated with both failure and non-failure conditions. The techniques herein provide for correlating the various counters or code flow tensors with the one or more different error states to be detected. Generally, the occurrence of an error state may be preceeded by execution of one or more particular code paths having different code flow tensors or counters. Thus if a particular code path is executed, it may be an indication that a subsequent error state will occur. The techniques herein provide for incrementing counters of the executed code paths and using the particular counter values as a means to predict and detect a subsequent occurrence of a particular error state.

Figure 3:
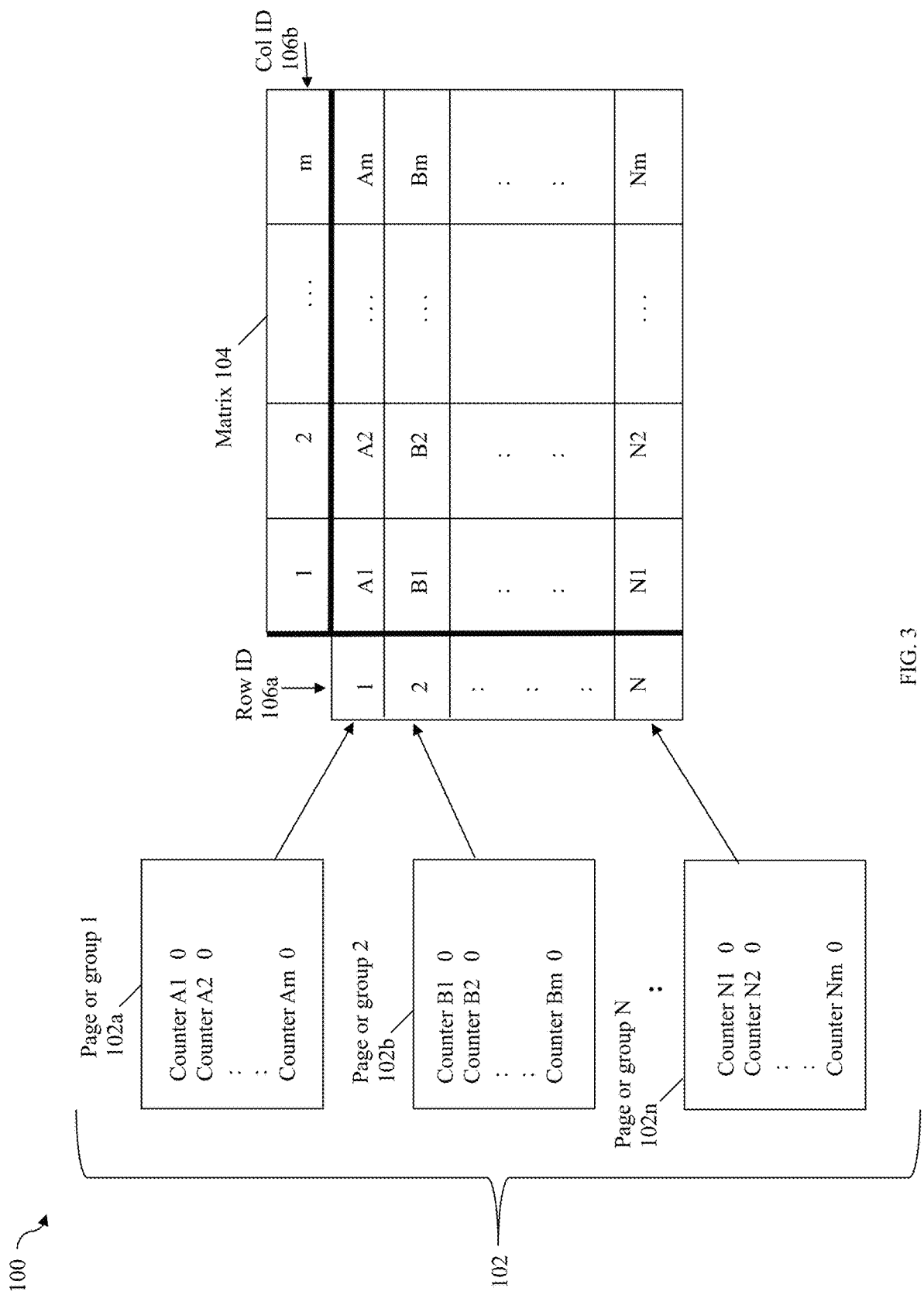
FIG. 3 is an example illustrating use of the counter values in forming a matrix in an embodiment in accordance with the techniques herein.

Referring to FIG. 3, shown is an example 100 of using the code flow tensor or counter values of a single data set to form a matrix in an embodiment in accordance with the techniques herein.

The element 102 denotes a single sample or data set of collected counter values that is partitioned into N groups or pages 102a-102n of "m" counter values. Each of the N pages or groups 102a-n may include the same number of "m" counters. Each of the N pages 102a-n of counter values becomes one entry or cell in the matrix 104. Each of the N pages or groups 102a-n may have an associated row ID (identifier) 106a denoting a corresponding row in the matrix 104. For example, page or group 102a has an associated row ID=1, whereby the group 102a of counters is included as cells or entries of row 1 of the matrix 104; page or group 102b has an associated row ID=2, whereby the group 102b of counters is included as cells or entries of row 2 of the matrix 104; page or group 102n has an associated row ID=N, whereby the group 102n of counters is included as cells or entries of row N of the matrix 104. Generally, each of the pages or groups of counters 102a-n may be associated with a different row of the matrix 104 whereby counters of the group are used to populate entries of the associated row of the matrix 104. Each counter value is a value or content of a different entry or cell of the matrix 104. Thus, each counter of 102 has an associated row index or ID, R, of the matrix 104 and an associated column ID or index, C, of the matrix 104, where the counter value for a collection period is included in (R, C) denoting the entry or cell of the matrix containing the counter value. The cells or entries of the matrix 104 identify the particular counters mapped to the different cells. For example, entry 1,1 of the matrix 104 includes the counter value for the counter A1 of the page or group 102a; entry 1,2 of the matrix 104 includes the counter value for the counter A1 of the page or group 102a; entry N, 1 of the matrix 104 includes the counter value for the counter N1 of the page or group 102n; entry N, Nm of the matrix 104 includes the counter value for the counter Nm of the page or group 102a, and so on, for the various cells of the matrix 104.

The matrix 104 is an example of a two dimensional structure used to store counter values collected for a single data set or instance for one time period or collection period. More generally, any suitable structure of any suitable number of one or more dimensions may be used. In at least one embodiment, a set of counter values represented as a single matrix may be collected periodically, such as on a daily basis or weekly basis. More generally, the set of counter values may be collected for any suitable time period for code of an application executing on a system.

In at least one embodiment, the counter values may be expressed as a rate per day. In this manner, samples or data sets collected for different time periods from different systems or different application instances may be normalized and used in connection with the techniques herein. In at least one embodiment, the counter values may, for example, be normalized or scaled to a corresponding value in a defined range. In this manner, each counter value may be mapped to a relative corresponding value in the common defined range. In at least one embodiment using a colored image such as a colored heatmap image using 3 color channels of red, green and blue, the defined range may be 0 through $2^{24}$-1, or 0 through 16777215, inclusively. In such an embodiment, the defined range represents a range of value based on the collective number of bits of all 3 color channels (assuming 8 bits per color channel). In such an embodiment, each cell or entry of the matrix may be normalized or mapped to a corresponding value in defined range. To further illustrate, assume the raw counter values prior to normalization are integer values in the range from 0 through 255. Assume further that such raw counter values are scaled or mapped to a corresponding value in the defined range 0 through 16777215. A first raw counter value collected denotes a rate of 255 and may mapped to a scaled or normalized value of 16777215 in the defined range. Thus, normalizing the raw counter values may include adjusting the raw counter values measured on different scales to the defined common scale, such as the defined range of 0 through 16777215.

As described herein, an embodiment in accordance with the techniques herein may optionally convert the matrix 104 to an image. In at least one embodiment, the image may be a grayscale image, where the counter values denote the displayed pixel intensities of the image. In such an embodiment, the displayed image may have varying degrees of gray shading from black (e.g., denoting a zero counter value) to white (e.g., denoting a maximum counter value).

Figure 4:
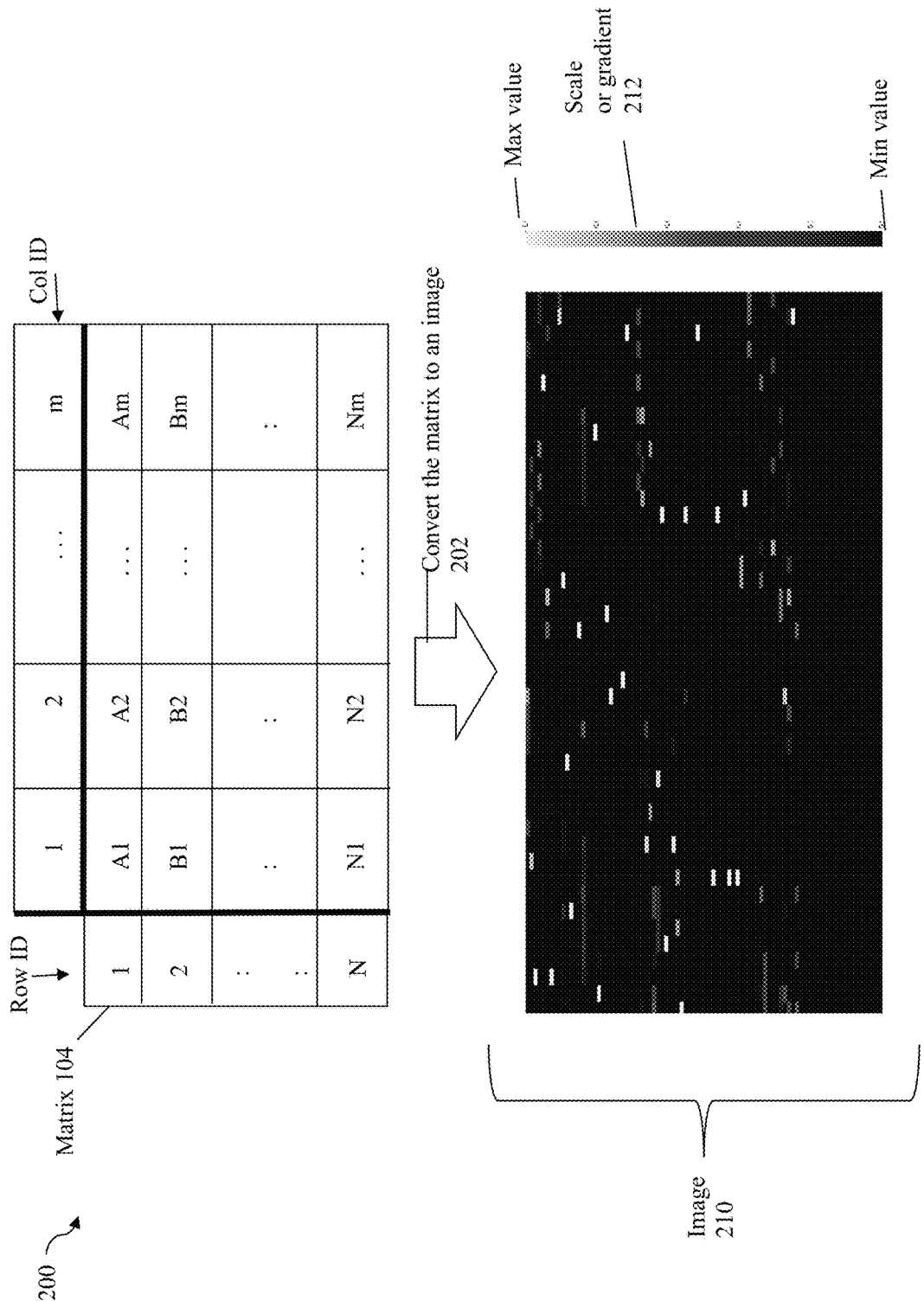
FIG. 4 is an example illustrating conversion of the matrix of counter values to an image in an embodiment in accordance with the techniques herein.

In at least one embodiment, the image may be a colored heatmap image. For example, reference is made to the example 200 of the FIG. 4. In the example 200, the matrix 104 is illustrated and converted 202 to the image 210. In the example 200, the image 210 is a heat map. The heat map 210 may be characterized as a graphical representation of data where the individual values contained in the cells or entries of the matrix 104 are represented as colors. In such an embodiment, the counter value may be mapped to a particular color as well as an intensity of the color. For example, in at least one embodiment, different ranges of the counter values may be associated with different colors displayed in the heat map. Generally, the image 210 may be divided into a grid and within each square of the grid, the heat map shows the relative intensity of values by assigning each value a color representation. For example, in at least one embodiment, the image may be a digital color image that includes color information for each pixel. Each counter value may be used as a single pixel value. In at least one embodiment, 3 color channels may be provided for red, green and blue. In at least one embodiment, the color image has 3 channels per pixel using any suitable image file format with 8 bits per pixel or 256 different values with 3 bits per color channel. In such an embodiment consistent with other discussion herein, each raw of collected counter value may scaled, such as by normalization as described elsewhere herein, to a value in the range of 0 through 16777215. Of course, other embodiments may represent each pixel using a different number of bits and using any suitable image file format.

In the example 200, a scale or gradient 212 may be provided denoting the associated color(s) and intensities used to encode the different counter values of the matrix 104 as represented in the image 210. In an embodiment as described above in which the image 210 is formed from cells or entries each having a normalized counter value in the defined range of 0 through 16777215, the scale or gradient 212 may denote the possible values in the defined range, for example, where the min value is 0 and the max value is 16777215.

In at least one embodiment, each acquired data set may be represented as a matrix, where the matrix is then converted to an image that is labeled with state information. The state information may generally be associated with the data set, matrix and image may indicate a current state of the data storage system associated with the image, matrix and data set. Once the data set, matrix, and image are acquired, they may be initially labeled with state information indicating a non-error or normal state. If an error occurs in the system or application within a defined period of time that is subsequent to when the data set or sample is acquired, the state information associated with the data set, matrix and image may be updated to denote the particular error that occurred as well as a time interval prior to the error occurrence. For example, the data set may be acquired on Jan. 7, 2019. A particular error having an associated error code E1 may occur on Jan. 9, 2019. In this case, the data set and its associated matrix and image may be relabeled where the state information of the data set, matrix and image indicate the error code E1 and a time interval of 2 days prior to receiving the error code E1. In this manner, the time interval of the state information may indicate that the labeled data set, matrix and image denote the state of the data storage system a specific amount of time prior to the occurrence of the error code E1.

In at least one embodiment, the state information may identify one of a set of predefined states that may occur in the data storage system. The predefined states may include both error and non-error states. In at least one embodiment, the predefined states may include a single non-error or normal state and may include one or more error states. If the state information indicates that the current state is an error state, the particular error may be identified along with an associated time interval as discussed above that denotes an amount of time prior to the occurrence of the particular error.

As a variation, in another embodiment, the predefined states may include, multiple levels of states, where each level may correspond to a different severity category. For example, in at least one embodiment, the predefined states may include a first level denoting a normal state and a lowest level of severity, a second level denoting one or more warning states associated with a mid level of severity, and a third level of one or more error states associated with the highest level of severity. If the state information indicates that the current state is other than normal, the state information may include an associated time interval as discussed above that denotes an amount of time prior to the occurrence of the particular error. Generally, an embodiment having multiple levels or severity states may denote a time sequence of states and associated imaged denoting a sequential transition between progressive states from a normal state to an error state. In the sequence, there may be one or more intermediate states and associated severity levels between the normal state and the error state. For example, for an error state E2, the time sequence of images may denote the intermediate progressive states of the system or application prior to transitioning into the error state E2. Each of the intermediate states may denote a different amount of time prior to the occurrence of the error state E2. A more detailed example of a time sequence of images including such intermediate states is described elsewhere herein, for example, such as in connection with FIGS. 12 and 13.

Figure 5:
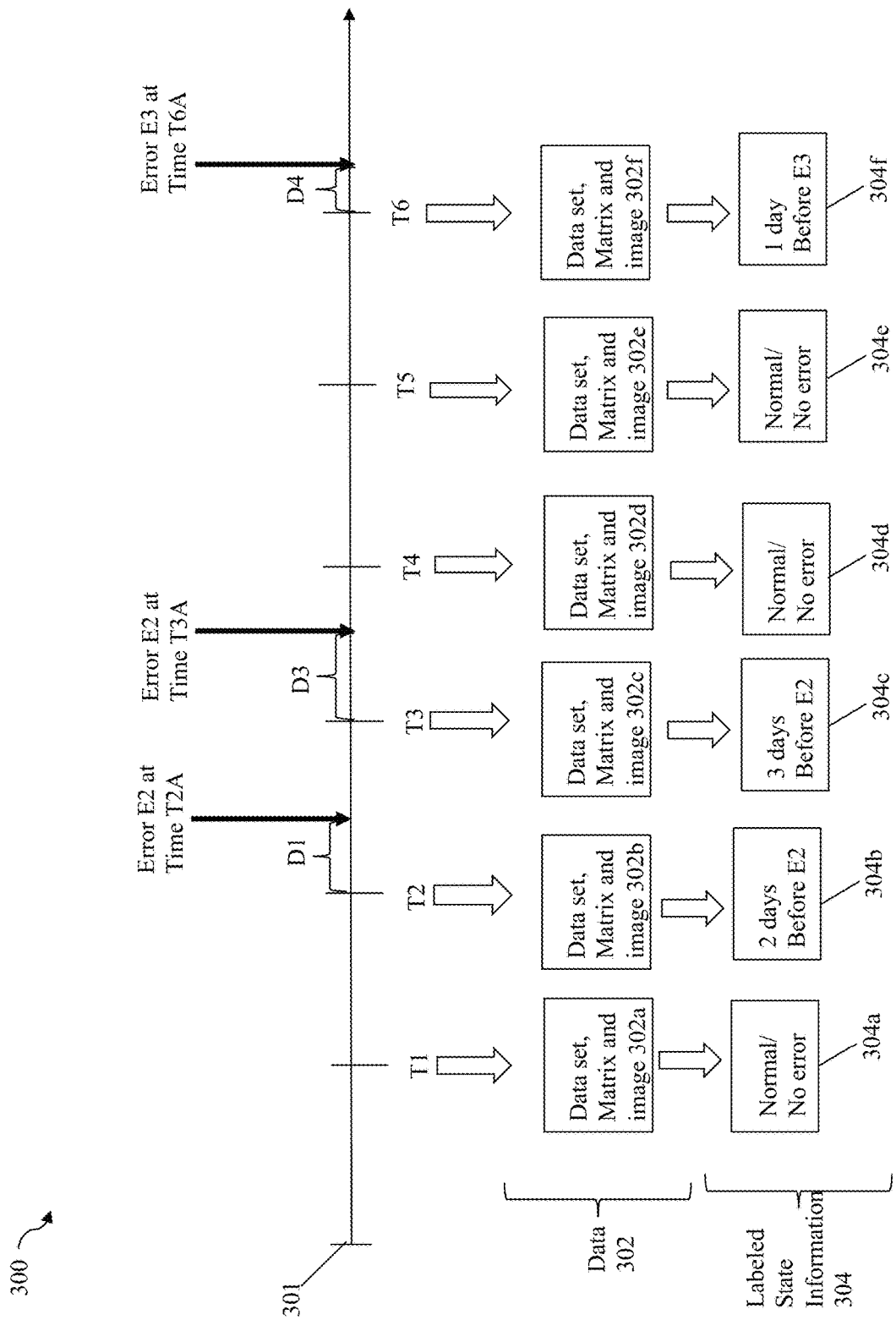
FIG. 5 is an example illustrating labeling data sets, matrices and images with state information in an embodiment in accordance with the techniques herein.

Referring to FIG. 5, shown is an example 300 illustrating in more detail processing that may be performed in connection with labeling data sets, matrices and images with state information in an embodiment in accordance with the techniques herein.

The example 300 includes a time line 301 illustrating time increasing from left to right. The time line 301 includes points in time T1, T2, T3, T4, T5 and T6, where a new data set is acquired at each such point in time. Additionally, the time line 301 includes points in time T2A, T3A and T6A, where error E2 occurs at each of the points in time T2A and T3A, and error E3 occurs at the point in time T6A. In the example 300, the data 302 includes the data set, matrix and image 302a acquired at the time T1, the data set, matrix and image 302b acquired at the time T2, the data set, matrix and image 302c acquired at the time T3, the data set, matrix and image 302d acquired at the time T4, the data set, matrix and image 302e acquired at the time T5, and the data set, matrix and image 302f acquired at the time T6.

The elements 302a-f denoting the different data sets are respectively labeled with corresponding state information 304a-f. The data set, matrix and image 302a acquired at the time T1 is labeled with the state information 304a denoting a normal or no error state since no error occurs during the time period or window from T1 to T2. The data set, matrix and image 302b acquired at the time T2 is labeled with the state information 304b denoting 2 days before E2 since the error E2 occurs at the time T2A that is 2 days after the time T2. In other words, D2 denotes a time period or window of 2 days. The data set, matrix and image 302c acquired at the time T3 is labeled with the state information 304c denoting 3 days before E2 since the error E2 occurs at the time T3A that is 3 days after the time T3. In other words, D3 denotes a time period or window of 3 days. The data set, matrix and image 302d acquired at the time T4 is labeled with the state information 304d denoting a normal or no error state since no error occurs during the time period or window from T4 to T5. The data set, matrix and image 302e acquired at the time T5 is labeled with the state information 304e denoting a normal or no error state since no error occurs during the time period or window from T5 to T6. The data set, matrix and image 302f acquired at the time T6 is labeled with the state information 304f denoting 1 day before E3 since the error E3 occurs at the time T6A that is 1 day after the time T6. In other words, D4 denotes a time period or window of 1 day.

FIG. 5 is an example generally illustrating one way in which state information denoting a label may be determined for a particular acquired data set and its associated matrix and image. The matrix may be generated from the acquired data set as described elsewhere herein such as, for example, in connection with the FIG. 3. Subsequently, the matrix may be represented or converted to an image as described elsewhere herein such as, for example, in connection with FIG. 4. Generally, new data sets of counter values may be acquired at any desirable time interval such as, for example, on a daily basis. Each data set may be labeled with state information in accordance with whether an error occurs within a specified amount of time subsequent to the point in time at which the data set is acquired. If an error occurs within the specified amount of time subsequent to the point in time X1 when the data set is acquired, the data set (and its associated matrix and image) may be labeled with state information denoting the error as well as an amount of time prior to when the error occurs. The amount of time may be the distance or difference between the point in time X2 when the error occurs and the prior point in time X1 when the data set was acquired.

Consistent with other discussion herein, an embodiment in accordance with the techniques herein may utilize continuous training of two NNs, such as two CNNs.

Figure 6:
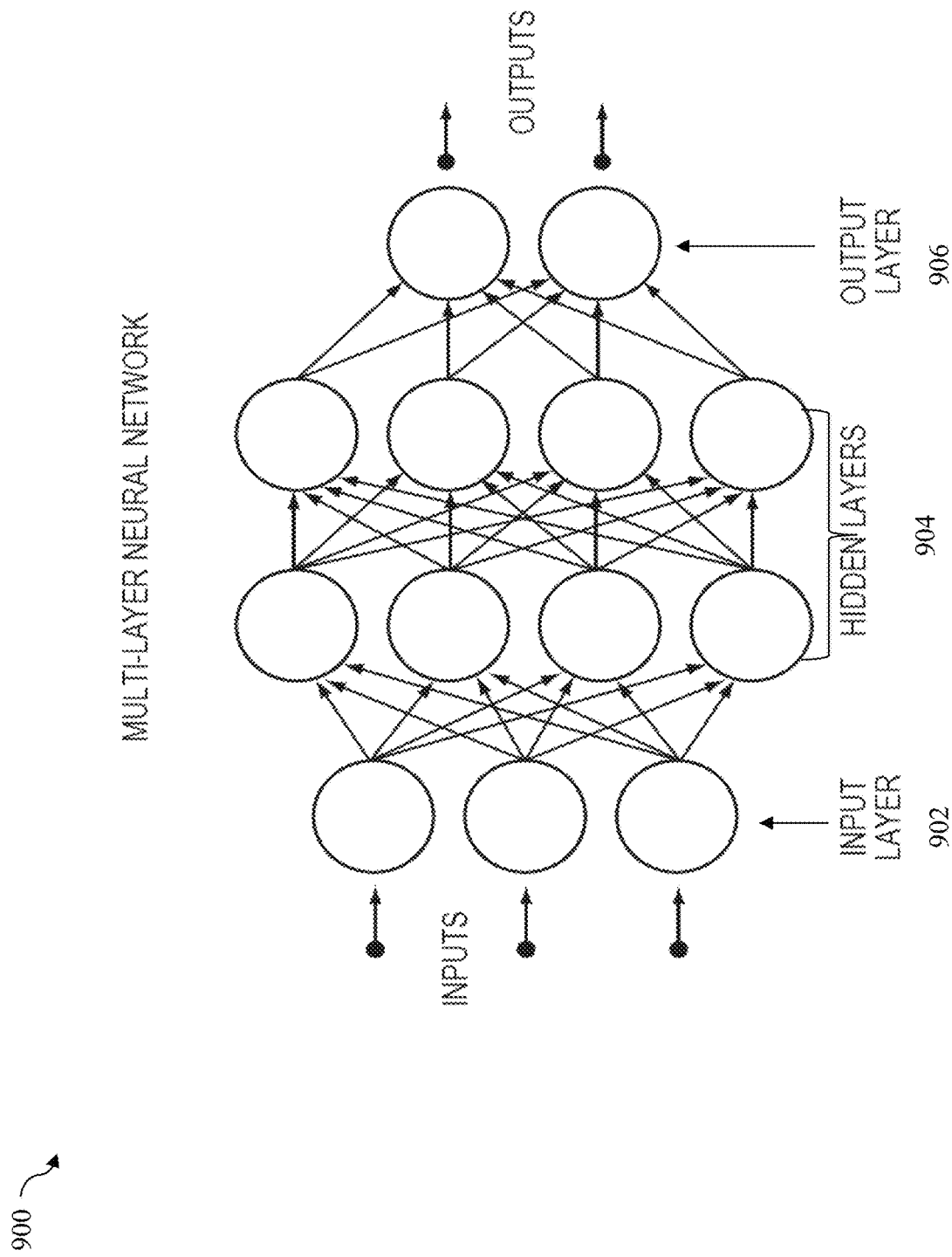
FIGS. 6 and 7 are examples illustrating a neural network in an embodiment in accordance with the techniques herein.

Referring to FIG. 6, shown is an example representation 900 of a NN that may be used in an embodiment in accordance with the techniques herein. The NN 900 includes an input layer 902, one or more hidden layers 904 and an output layer 906. Generally, each of the layers of 902, 904 and 906 may include any suitable number of layers.

In at least one embodiment in accordance with the techniques herein, the NN used may be a CNN that accepts images as described herein as input.

Figure 7:
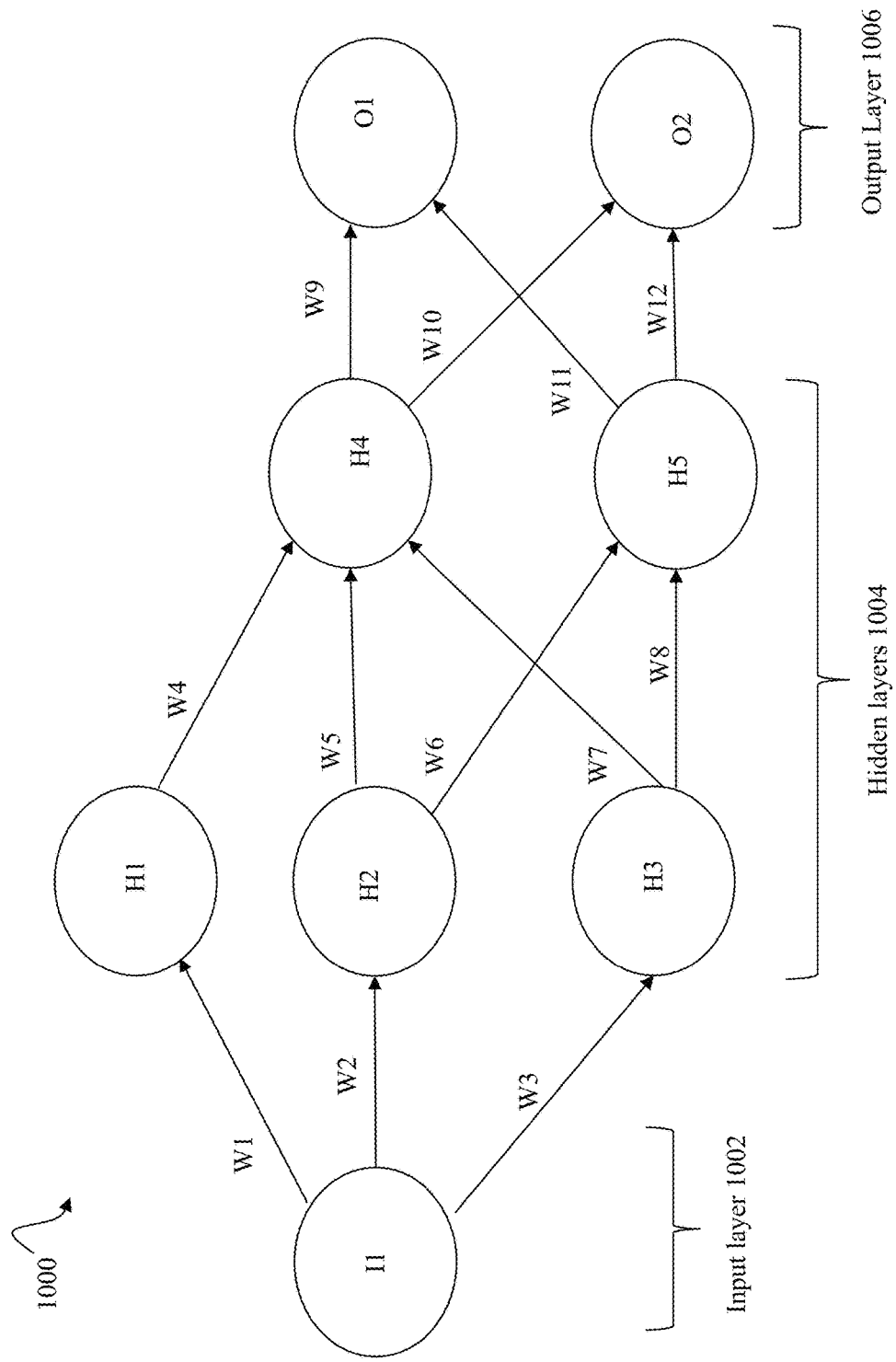

Referring to FIG. 7, shown is an example of a NN that may be used in an embodiment in accordance with the techniques herein. The example 1000 provides additional detail regarding the NN described elsewhere herein such as, for example, in connection with the FIG. 6. The example 1000 provides additional detail regarding a NN such as a CNN that may be used in connection with the techniques described herein. The particular number of layers, number of nodes, or connection provided in the example 1000 is only for purposes of illustration and discussion of a NN. Generally, the NN, such as the CNNs used in connection with the techniques herein, may include any suitable number of hidden layers, any suitable number of nodes per layer, any suitable connections between the various nodes and layers, and the like.

The example 1000 includes input layer 1002, hidden layers 1004 and output layer 1006. Consistent with other discussion herein, an input is provided to the input layer 1002 of the NN 1000 where the input passes through multiple hidden layers 1004 and outputs a prediction, as denoted by the one or more output nodes of the output layer 1006. Each of the layers 1002, 1004 and 1006 includes one or more nodes also referred to as neurons. Each node is a different neuron. The example 1000 includes an input layer layer 1002 with a single input for purposes of simplifying the illustration. However generally each of the layers of 1002, 1004 and 1006 may include any number of nodes or neurons. Additionally, there may be one or more hidden layers 1004. In the example 1000, the input layer includes neuron I1; the first hidden layer includes nodes H1, H2 and H3; the second hidden layer includes nodes H4 and H5; and the output layer includes nodes O1 and O2.

Connections or synapses are shown between pairs of nodes. In the example 1000, each connection or synapse is denoted by an arrow from an output node or neuron of one layer to an input node or neuron of another layer. Each connection or synapse "i" also has an associated weight, denoted as Wi, "i", being a non-zero integer. In the NN 1000, there are 12 connections or synapses between pairs of nodes where weights of the 12 connections are denoted as W1-W12, inclusively. The particular weight Wi associated with a particular connection from a first node to a second node denotes that the output of the first node is weighted when provided as an input to the second node.

When the NN is in training mode, as discussed in more detail elsewhere herein and an input is provided to the NN, one or more of the weights W may be modified or adjusted as optimal values for the weights W are learned in order to accurately predict the outputs of layer 1006. Thus, the NN of the example 1000 may be provided an input during training whereby one or more of the 12 weights W1-W12 may be adjusted in response to processing the input.

Figure 8:
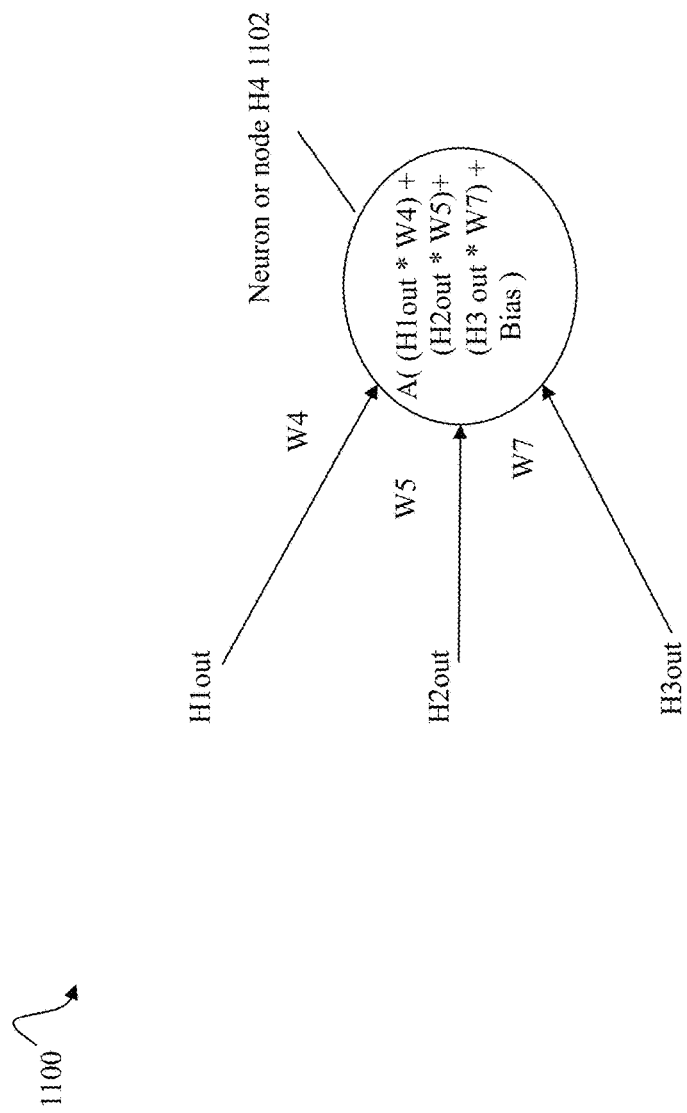
FIG. 8 is an example illustrating weights and a neuron or node of a neural network in an embodiment in accordance with the techniques herein.

Referring to FIG. 8, shown is an example illustrating in more detail a particular neuron of the NN from FIG. 7 that may be used in an embodiment in accordance with the techniques herein. The example 1100 provides further detail about the single node or neuron H4 1102 from FIG. 7. However, other neurons of the hidden layers 1004 and output layer 1006 also have similar weighted inputs and activation functions.

Each neuron in the layers 1004, 1006 combines one or more weighted inputs, applies an activation function A, and returns an output which is the output signal from the neuron to one or more other neurons. For example, the neuron H4 1102 is in the second hidden layer of 1004 of FIG. 7 and has the 3 inputs from the 3 neurons H1, H2 and H3 of the first hidden layer of 1004. The output from the neuron H1 is denoted as H1out, the output from the neuron H2 is denoted as H2out and the output from the neuron H3 is denoted as H3out. Each of the 3 outputs H1out, H2out and H3out are weighted, respectively, by corresponding synaptic weights W4, W5 and W7. The weight of a connection, such as W4, is applied to the output of one neuron (e.g., H1) that is an input to another neuron, such as H4 1102. In the neuron 1102, the activation function is denoted by the "A" which applies the activation function "A" to the sum of the weighted inputs to node H4. In the node H4 1102, the weighted sum of the inputs is (H1out*W4)+(H2out*W5)+(H3 out*W7). Additionally shown is a bias value, Bias, that may be added to the weighted sum of the inputs calculated at each node (except the input layer nodes) during the feed-forward phase.

When a NN is trained to recognize particular states or events, the weights and bias values of the neurons are learned and may be adjusted during the training process in order to find optimal values for the weights and bias values of the neurons to enable accurate prediction of the desired outputs for particular corresponding inputs.

Figure 9:
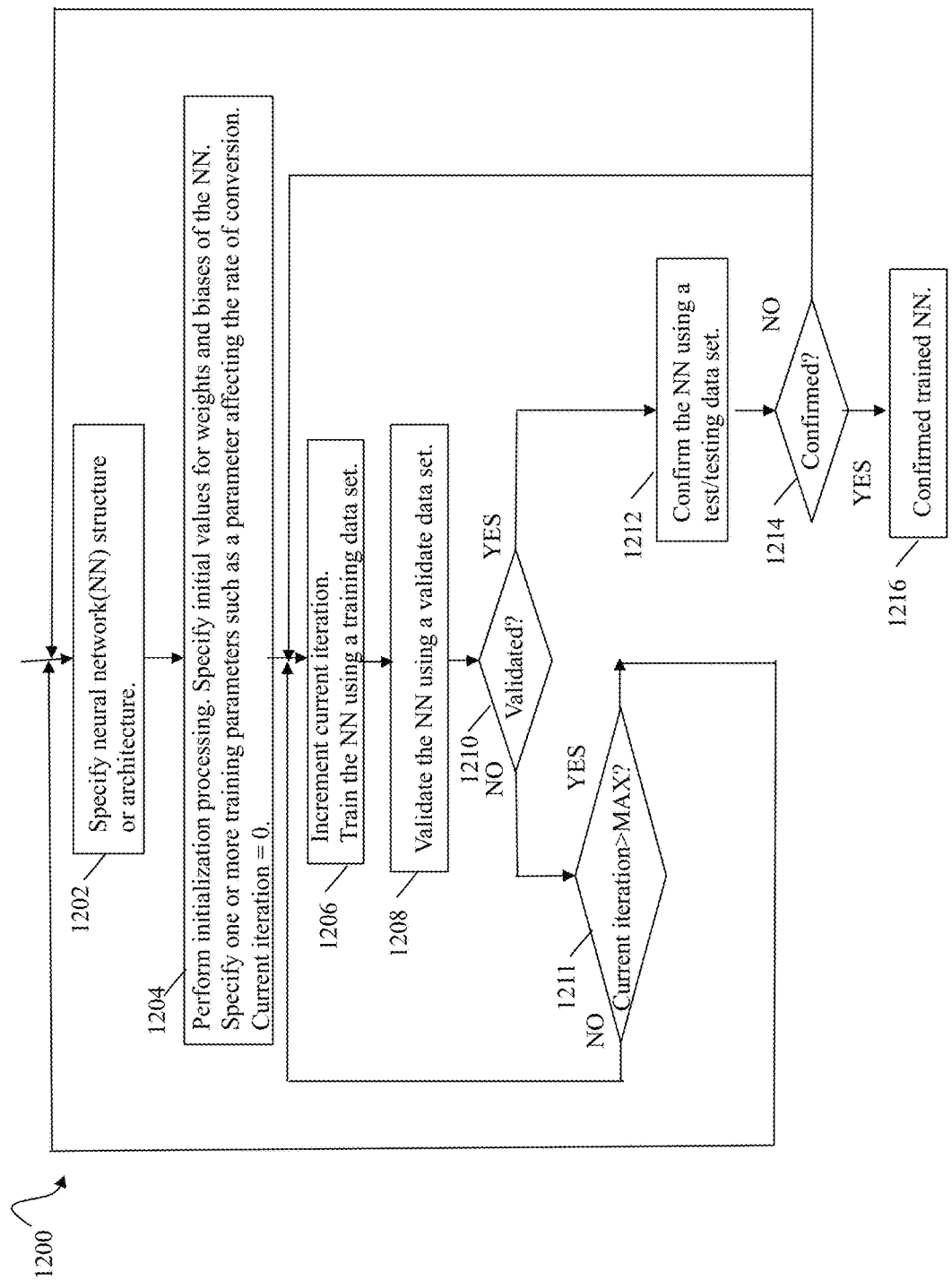
FIGS. 9 and 11 are flowcharts of processing steps that may be performed in an embodiment in accordance with the techniques herein.

What will now be described is general processing that may be performed to obtain a final model of a machine learning system. In at least one embodiment, the model of the machine learning system may be a NN, such as a CNN, as described herein. Generally, building the final NN or model is obtained as a result of performing an overall process described below with reference to the FIG. 9. The processing described in connection with FIG. 9 may be performed in connection with training a CNN used in an embodiment in accordance with the techniques herein.

As a first step 1202, the NN structure or arrangement is determined based on parameters, sometimes referred to as hyper-parameters that define the NN architecture. The hyper-parameters may include, for example, determining a number of hidden layers in the NN, the number of neurons in each of the layers (e.g., input layer, hidden layers and output layer), determining the synapses or connections between neurons of the different layers, and selecting an activation function used by the neurons.

Once the step 1202 has completed, control proceeds to an initialization step 1204. The step 1204 may be performed prior to training the NN using a training data set. The initialization processing of the step 1204 may include specifying initial values for a second set of NN parameters that are tuned, adjusted or "learned" during training. For example, initial values may be specified for the weights applied to the synaptic connections or inputs to the neurons. Initialization may also provide initial bias values of the second set. Additionally, values may be specified for one or more other parameters affecting the NN training. For example, one or more training parameters may be specified that affect the rate of convergence or learning rate. The step 1204 may also include initializing a counter, current iteration, to zero (0). The counter current iteration is used in the particular embodiment illustrated in subsequent processing to prevent the possibility of an infinite loop whereby the current NN may never be successfully validated in the step 1210, such as, for example, where the error rate converges to a value that is above the specified threshold.

Once the initialization processing of the step 1204 has completed, control proceeds to the step 1206. In the step 1206, the current iteration counter is incremented by 1. Also in the step 1206, the NN training may be performed using the training data set. During the training of the step 1206, the weights of the synapses or connections between neurons are tuned or modified with the general goal of minimizing a cost or loss function. During the training, the bias values of the neurons may also be similarly tuned or adjusted. The NN may be trained, for example, using a supervised learning method such as gradient descent or other suitable technique known in the art. The training data set may include sets of input data provided as input to the NN. For each input vector or set of input data, such as an image described elsewhere herein, the training data set also includes a corresponding output data set or vector denoting the expected or correct output result that a properly trained NN should output (for the corresponding input data). The current NN model is run using the input data of the training data set and produces a result. The result generated by the NN during the training is then compared to the expected output of the training dataset. Based on the result of the comparison and the specific learning algorithm being used, the parameters of the NN model are adjusted. For example, as noted above, such adjustments may be made to the NN weights and bias values. The model fitting can include both variable selection and parameter estimation.

Once the training step 1206 has completed, control proceeds to the step 1208. At the step 1208, validation processing may be performed. During validation, the weights and bias values are not being adjusted. Rather, validation processing is generally evaluating the predictive capabilities of the current NN model using the weights and bias values resulting from the training. The validation processing of the step 1208 may include performing NN validation using a second data set often referred to as the validation data set. The validation data set may be different than the training data set and may be used to provide an unbiased evaluation of the current NN resulting from completion of the training using the training data set. The validation data set may be similar in structure and form to the training data set described above. The validation data set may include sets of input data provided as input to the NN. For each input vector or set of input data, such as an image described elsewhere herein, the validation data set also includes a corresponding output data set or vector denoting the expected or correct output result that a properly trained NN should output (for the corresponding input data). The current NN model is run using the input data of the validation data set and produces a result. The result generated by the NN during the validation is then compared to the expected output of the validation data set. The fitness or goodness of the current NN model may be evaluated, for example, using an error function and the result of the comparison (e.g., of the result generated by the NN during the validation to the expected output of the validation data set). For example, the error function may generate a measured error rate obtained based on the result of the comparison. If the measured error rate is not below a specified threshold, for example, the training and validation processing of the NN may be repeated any one or more times as needed to obtain a trained NN that meets the specified threshold or other criteria. Validation datasets may also be used for regularization by early stopping. For example, an embodiment may stop training the NN when the error rate obtained using the validation dataset increases, as this is a sign of possibly overfitting to the training dataset. More generally, one or more stopping criteria may be specified to indicate when to stop training the NN whereby the NN may be considered the final NN model.

Thus, as illustrated in the flowchart 1200, once validation processing of the step 1208 has completed, control proceeds to the step 1210 where a determination is made as to whether the NN may be considered validated meeting any specified criteria such as noted above. If the step 1210 evaluates to no, control proceeds to the step 1211. At the step 1211, a determination is made as to whether the counter current iteration exceeds MAX, where MAX denotes a specified maximum number of allowable processing iterations. If the step 1211 evaluates to no, control returns to the step 1206 where the processing of training and validating is again repeated. If the step 1211 evaluates to yes, control returns to the step 1202.

If the step 1210 evaluates to yes whereby the NN has been successful validated, control proceeds to the step 1212. In the step 1212, the final NN model may be evaluated using a test dataset to provide an unbiased evaluation of a final NN model. The test data set may be unique in comparison to the training and validation data sets. The test dataset is used to confirm the acceptable predictive capabilities of the final NN model. The final NN model may be evaluated using the test data set in a manner similar to that as described above with the validation data set whereby a resulting error rate may be obtained. In at least one embodiment, criteria may be specified where the error rate obtained with the test data set may be compared with the prior error rate obtained from the last evaluation of the NN model with the validation data set. In at least one embodiment, the validity of the final NN model may be confirmed if the error rate obtained with the test data set does not exceed the prior error rate obtained from the last evaluation of the NN model with the validation data set by more than a specified threshold. If the validity of the final NN model is not confirmed, one or more actions may be taken. The one or more actions may include, for example, repeating the training and validation as described above. The one or more actions may include further evaluating the NN model to try an alternative NN model structure, arrangement or architecture by modifying one or more of the hyper-parameters (e.g., return to the first step as described above).

Thus, once the step 1212 has completed, control proceeds to the step 1214 where a determination is made as to whether the NN confirmation was successful. If the step 1214 evaluates to no, control may return to the step 1202 or the step 1206 depending on the particular action(s) taken, as discussed above. If the step 1214 evaluates to yes, control proceeds to the step 1216 where processing has successfully confirmed that the NN is now a trained NN.

Generally, any suitable technique and criteria may be used to train and evaluate a NN model and obtain the data sets utilized in connection with processing of the flowchart 1200. Once the final NN model has been generated as a result of training and confirmed (e.g., step 1216) as meeting any specified criteria used in connection with evaluation (e.g., criteria used with evaluating the NN in connection with the validation processing and confirmation using the test data set), the final NN may be characterized as a trained NN having the particular weights and bias values selected as a result of such processing. The trained NN may then be used to predict subsequent outputs based on specified inputs.

The trained NN may be defined by its hyper-parameters denoting its structure or architecture as noted above. The trained NN may also be defined by a first set parameters that are learned through the process described above. The first set of parameters may include the bias values and weights determined through the training, validation and confirmation processing of the NN described above. Thus, at a first point in time the trained NN with the first set of parameters may be used to predict outputs based on specified inputs.

Subsequent to the first point in time, the trained NN may be further trained or retrained, for example, to recognize or predict additional or different outputs. Such retraining may be performed as described above using additional data sets. After such retraining at a second point in time whereby the resulting predictive performance of the NN is again validated and confirmed meeting any specified criteria, the trained NN may be defined by its hyper-parameters as well as an updated or revised set of parameters associated with learning to predict the additional or different outputs. The revised set of parameters at the second point in time may include an updated set of weights and bias values where one or more of these values may have been updated in comparison to those of the first set. Generally, the trained NN may be subsequently retrained any number of times.

When the NN is being trained or retrained, processing is performed to tune, adjust and select values for the weights and biases that optimize the ability of the NN to predict outputs given particular inputs. Thus during training and retraining, one or more of the weights and bias values may be updated (e.g., in comparison to prior values or starting values of the weights and biases prior to training or retraining). Once a particular set of weights and bias values used with a NN has been validated and confirmed as meeting any specified criteria, the NN may be characterized as a trained NN with the particular weights and bias values.

The trained NN may be used in a non-training or non-learning mode where the particular weights and bias values are fixed and not adjusted. In this non-training or non-learning mode, the trained NN may be used to predict outputs based on specified inputs without further modifying any of its weights and bias values.

In at least one embodiment with reference to FIG. 6, the CNN used in connection with the techniques herein may include a node in the output layer for each state learned and predicted by the CNN. For example, the CNN may include an output layer with one or more nodes, where there is a different single node in the output layer for each error or other state predicted by the CNN. The CNN may output, for example, a single dimensional vector or array of values where each entry of the vector corresponds to a different node of the output layer and each entry is a real number between 0.0 and 1.0, inclusively, where the number may denote a percentage or probability of the error, state or event associated with the entry occurring. Each entry located at a position "i" in the vector may correspond to a different state and the value of entry output by the CNN may denote the predicted likelihood that the associated different state will occur. If the value of the entry associated with a particular state, and thus node of the output layer, is greater than a specified threshold, such as 75% or 0.75, then it may be determined that the likelihood of the state occurring is sufficiently high enough to predict that the state will occur. Otherwise, in at least one embodiment processing predicts that the particular state will not occur.

In at least one embodiment, two CNNs, CCN1 and CNN2, may be initially trained using images where both CNN1 and CNN2 are in learning mode and their internal weights are adjusted based on the learning or training. Once both CCN1 and CNN2 are trained, one of the CNNs, such as CNN1, is selected as the active CNN and the other CNN, such as CNN2, is selected as the idle or passive CNN. The active CNN, CNN1, has been trained and is not in learning mode. The idle CNN, CNN2, remains in training or learning mode where its weights continue to be adjusted where the idle CNN continues to learn when processing incoming images based on newly acquired data sets. During the time while CNN2 remains in the training or learning mode, CNN1 is used to infer or predict the state based on the incoming images.

For a first period of time, CNN1 is active and is used to infer or predict the future state of the data storage system based on the subsequent incoming data. For the same first time period, CNN2 is idle and continues training using the same subsequent incoming data as CNN1. After the first time period has elapsed, the role or mode of CNN1 and CNN2 are swapped, where CNN1 becomes idle and CNN2 becomes active for the duration of a second time period. In the second time period, CNN2 as the active CNN is no longer in learning or training mode whereby its weights are not adjusted when processing subsequent incoming data. In the second time period, CNN1 as the idle CNN is placed in learning or training mode whereby its weights are adjusted when processing subsequent incoming data. In the second time period, CNN2 is active and is used to infer or predict the future state of the data storage system based on the subsequent incoming data. For the same second time period, CNN1 is idle and continues training using the same subsequent incoming data as the active CNN2.

For subsequent time periods, the two CNNs, CNN1 and CNN2, may repeatedly alternate and switch roles of active and idle. In this manner, an embodiment in may use continuous learning techniques such as described herein where the idle CNN is retraining based on the new input data and where the active CNN is inferring or predicting the subsequent state of the system based on the same new input data. In at least one embodiment, the roles of the two NNs may be swapped as described herein on a monthly basis or, more generally, any suitable time period.

Figure 10:
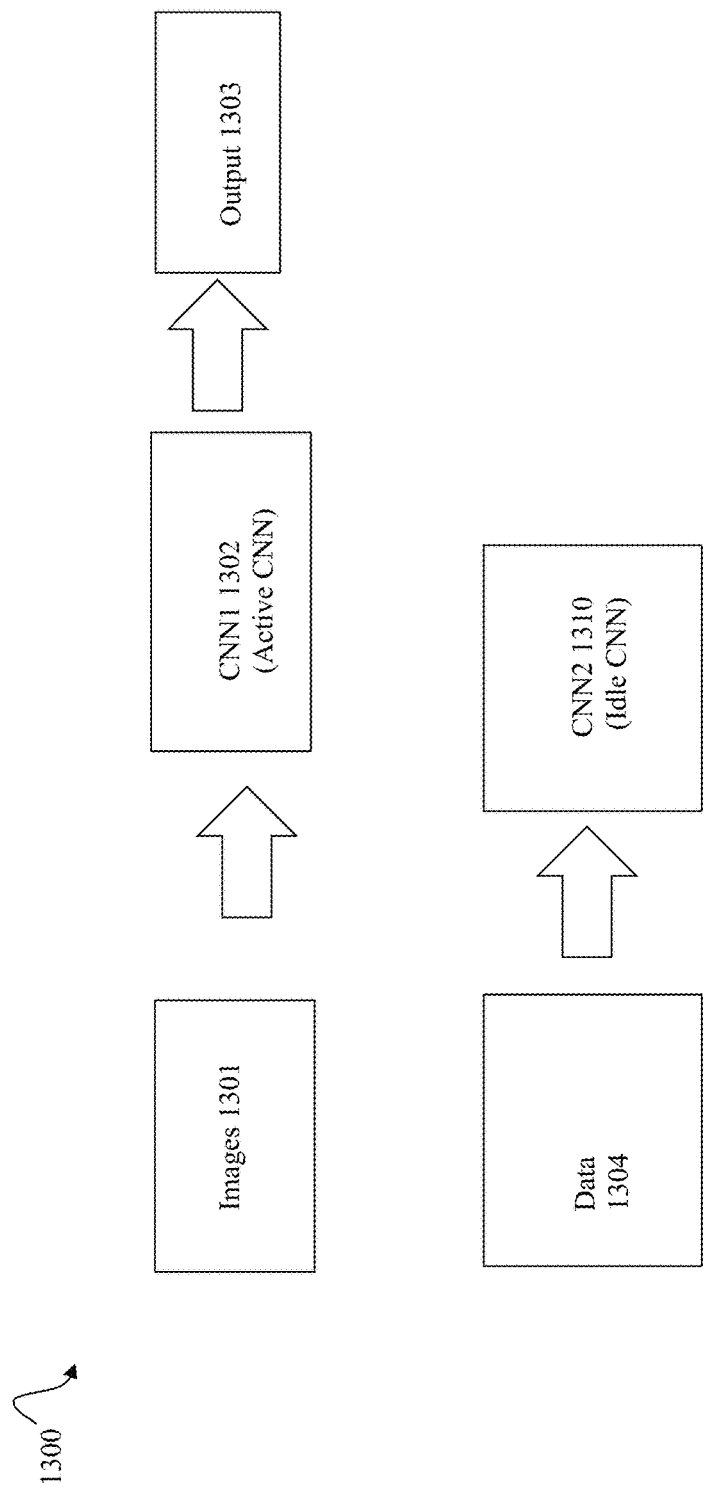
FIG. 10 is an example illustrating using of two convolution neural networks in an embodiment in accordance with the techniques herein.

Referring to FIG. 10, shown is an example illustrating components in an embodiment in accordance with the techniques herein. In the example 1300, a first CNN, CNN1 1302, may be initially trained as described herein to recognize desired states, errors and events in the system. Once the CNN1 1302 has been trained, the CNN1 1302 may be designated as the active CNN for a first point in time and placed in a non-learning or non-training mode. One or more images 1301 may be provided as inputs to the CNN1 1302, where for each of the images 1301, the CNN1 1302 as the active CNN generates an output 1303 used to infer or predict an expected state of the data storage system. In at least one embodiment, the output may be a real number between 0.0 and 1.0, inclusively, where the number may denote a percentage or probability of an error or event, for which the CNN has been trained, occurring.

A second CNN, CNN2 1310, may be similarly trained as described above to recognize desired states, error, and events in the system. Once the CNN2 1310 has been initially trained, the CNN2 1310 may be designated as the idle CNN for the first point in time and placed in the learning or training mode as described herein. In this learning or training mode, the weights and bias values of the CNN2 1310 may be further adjusted based on inputs. The same one or more images 1301 (provided as an input to the CNN1 1302 that infers or predicts an expected state) may be included in the data 1304 used to further train the CNN2 1310. In particular, the data 1304 may include the one or more images 1301 each of which have been labeled, such as to denote a particular state of the system, where the one or more images 1301 may be used to further train the CNN2 1310 to predict the particular state. In at least one embodiment, the data 1304 may include the newly acquired data sets as well as other historical data sets so that the CNN2 1310 may be trained based on both the prior and newly acquired data sets.

The one or more images 1301 may be based on data sets acquired during a specified amount of time. After that specified amount of time has elapsed, the roles of the two CNNs, CNN1 1302 and CNN 1310 may be swapped. In this case, CNN1 1302 is placed in the learning or training mode (e.g., weights are adjusted) and becomes the idle CNN; and the CNN 2 1310 becomes the active CNN and is placed in the non-learning or non-training mode (e.g., weights are not adjusted). The foregoing swapping of roles of the two CNNs 1302 and 1310 may be repeatedly and subsequently performed in an ongoing manner to provide for continuous training and learning, where the currently active CNN is used to infer or predict the state of the system.

Figure 11:
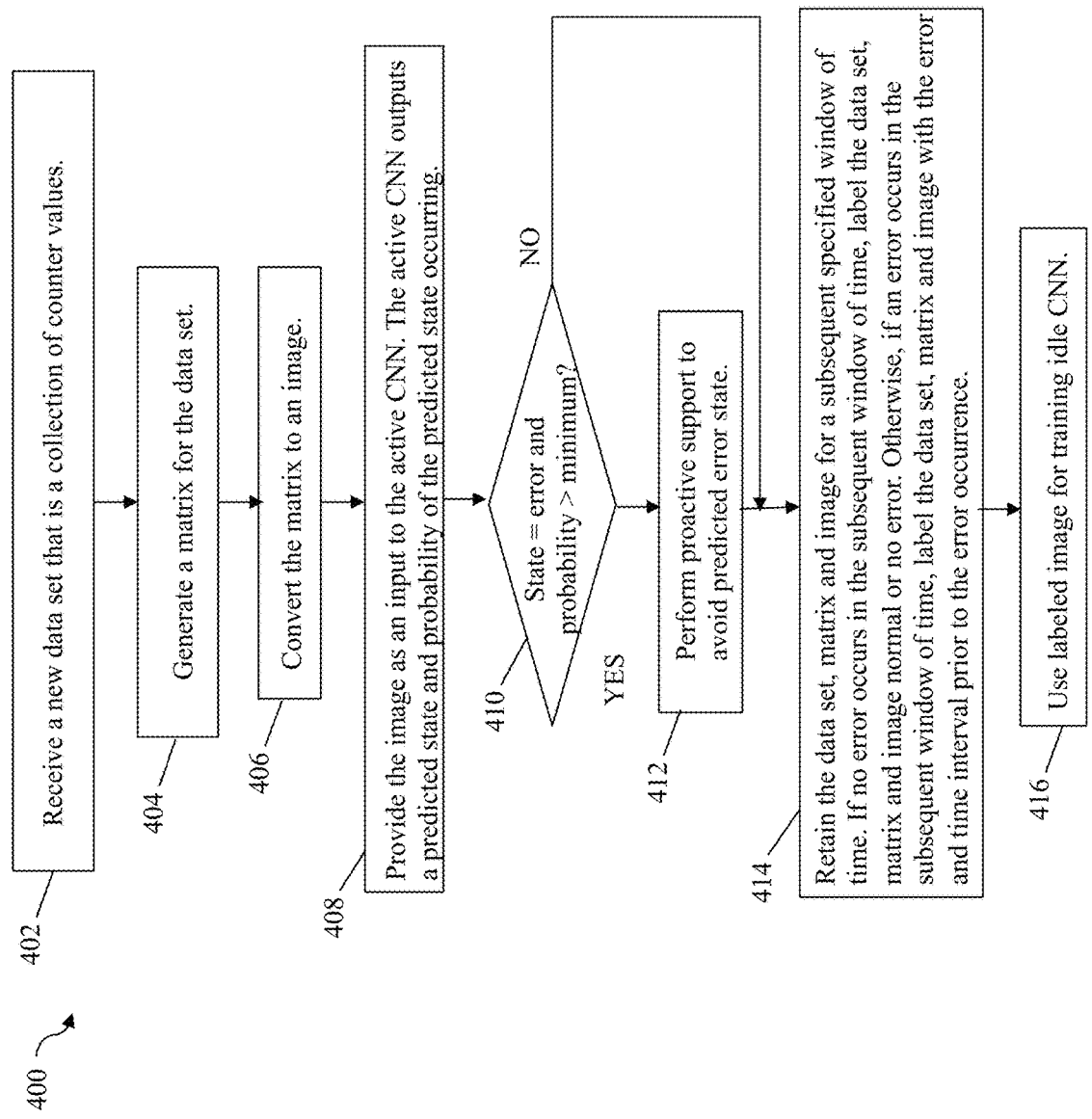

Referring to FIG. 11, shown is a flowchart 400 of processing steps that may be performed in an embodiment in accordance with the techniques herein. The flowchart 400 generally summarizes processing described above.

At the step 402, a new input data set may be received. The new data set may be a collection of counter values such as, for example, described in connection with FIG. 3. From the step 402, control proceeds to the step 404. At the step 404, a matrix is generated from the new data set such as, for example, described in connection with FIG. 3. From the step 404, control proceeds to the step 406 where the matrix is converted to, or represented as, an image, such as described, for example in connection with FIG. 4. From the step 406, control proceeds to the step 408.

At the step 408, the image generated in the step 406 may be provided as an input to the active CNN. The active CNN outputs a predicted state and probability of the predicted state occurring. From the step 408, control proceeds to the step 410. At the step 410, a determination is made as to whether the predicted state is an error state having a probability greater than a specified minimum. If the step 410 evaluates to true or yes, control proceeds to the step 412. At the step 412, proactive support measures or actions may be taken to avoid or mitigate the predicted error state. From the step 412, control proceeds t the step 414. If the step 410 evaluates to false or no, control proceeds to the step 414.

At the step 414, the data set, matrix and image may be retained for a subsequent specified window of time. If no error occurs in the subsequent specified window of time, the data set, matrix and image may be labeled with state information denoting a normal or no error state. Otherwise, if an error occurs in the subsequent specified window of time, the data set, matrix and image may be labeled with state information denoting the error and a time interval prior to the error occurrence. From the step 414, control proceeds to the step 416 where the labeled image (labeled in the step 414) may be used to train the idle CNN currently in the learning or training mode.

Consistent with discussion elsewhere herein, the processing of the flowchart 400 of FIG. 11 includes processing steps for an embodiment in which the matrix of counter values is optionally converted in the step 406 to an image. The image is subsequently used or referred to in other steps of the flowchart 400, such as the steps 408, 414 and 416. As described elsewhere herein, an embodiment may also omit the step 406 where the matrix is not converted to the image. In such an embodiment, subsequent processing steps may use the matrix rather than the image. For example, the matrix may be provided in the step 408 as an input to the active CNN and the labeled matrix may be used for training the idle CNN in the step 416. Generally, in such an embodiment using matrices without corresponding images, the matrices may comprise the various training and other data used with the CNNs.

Figure 12:
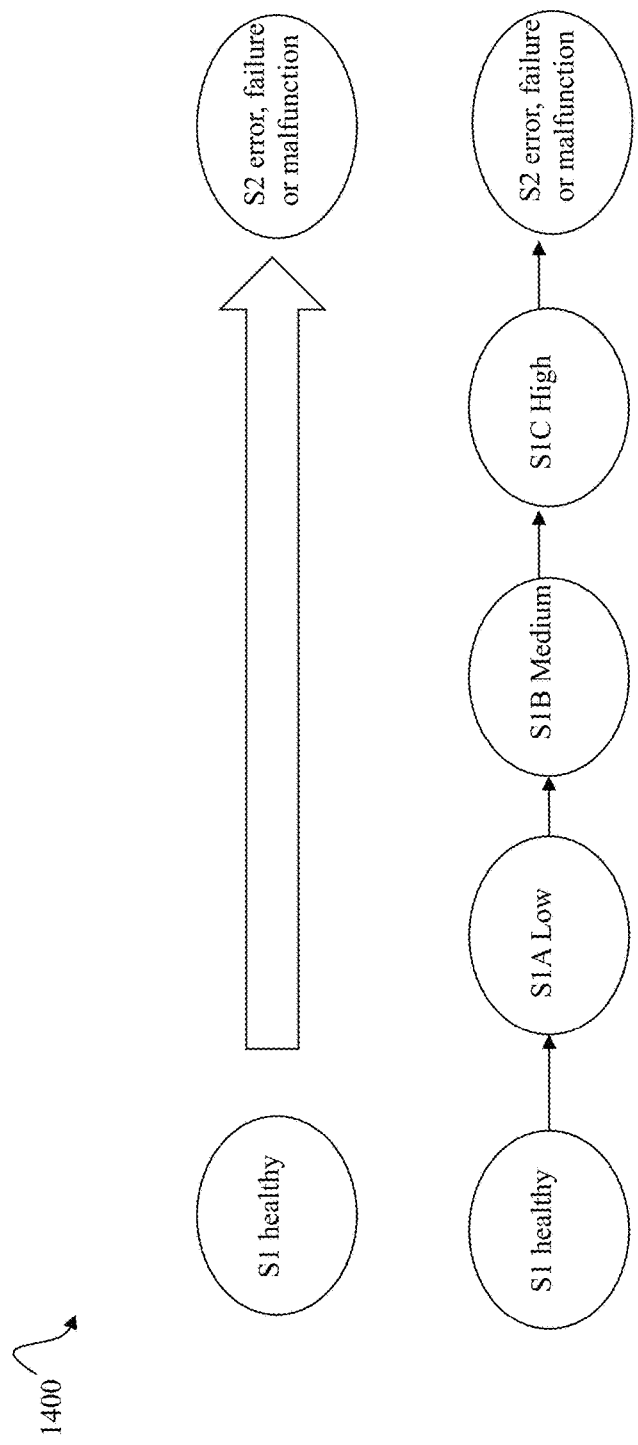
FIGS. 12 and 13 are examples illustrating a sequence of states in an embodiment in accordance with the techniques herein.

Referring to FIG. 12, shown is an example 1400 illustrating various intermediate states that may occur prior to a detected state or event, such as an error or failure. In the example 1400, S1 may denote a non-error, healthy or normal system state, and S2 may denote an error state, such as a major fault or malfunction state, such as when a physical drive fails. A CNN, such as CNN1 1302 and CNN 2 1310, may be trained to predict the occurrence of state S2 by detecting the intermediate states S1A low, S1B medium and S1C high each of which occur, in sequence, prior to reaching the S2 state. Thus, the foregoing sequence of intermediate states S1A, S1B and S1C may denote an increasing progression in the state of the system with respect to the state S2. Data sets may be acquired as described herein with labels corresponding to various time intervals prior to the occurrence of the error state S2, where such data sets may be converted into images denoting the time sequential intermediate states S1A low, S1B medium and S1C high progressing toward the error state S2.

In one aspect, the system as well as the affected component(s) may be characterized as transitioning between the various states of FIG. 12. For example, in the case where the error state S2 denotes the error state 2A3C, also mentioned elsewhere herein, in a data storage system for a SCSI write command. For example, a host or external data storage system client may issue a write command received by the data storage system for processing. However, the data storage system is unable to service or complete servicing the write I/O and return a completion status to the host within a specified threshold amount of time thereby causing a write time out error condition or result to be returned to the host. The cause of such an error on the data storage system may be due to any one or more possible conditions. For example, the data storage system may not have been able to acquire a free or available cache slot for storing the write data in the cache of the data storage system thus causing the timeout error condition. The inability to obtain a cache slot may be due to any one or more reasons, such as, for example, an overloaded data storage system that is unable to flush the cached write pending data to non-volatile backend physical storage on PDs at a fast enough rate to provide free cache slots for use with storing write data for a large number of incoming writes of a burst of heavy write I/O workload. In such a case, the state of the cache, such as characterized by a number, percentage or amount of free cache slots, may decrease sequentially over time. As cache slots are allocated on a particular code path for storing write pending data, for example, one or more counters incremented on the particular code path may increase over time with each such cache slot allocation. Thus, the images formed form the counter values at various sequential points in time may denote the changing state of the cache as it progresses to the state of no more free or available cache slots for storing write pending data. For example, the system, and thus the cache, may transition from the state S1 to the state S1A, transition from the state S1A to the state S1B, transition from the state S1B to the state S1C and then transition from the state S1C to the state S2.

In some instances for certain detected states and events, it may be possible to perform a remedial or corrective action to attempt to transition the component from one of the states, such as S1A, S1B or S1C to a healthier state, such as S1, before the component further continues to progress toward S2. In some cases, it may not be possible return the system or application to a healthy state. For example, the techniques herein may be used to detect a sequential time progression of the cache with no free cache slots that result in the 2A3C error state S2. For example, the techniques herein may be used to detect the occurrence of the state S1B and S1C and perform a corrective or remedial action when state S1B or S1C is detected. The corrective or remedial action may be, for example, to accelerate flushing write pending data from the cache to the backend PDs, as well as possibly other actions to increase the amount of free of available cache slots used for storing write pending data. Thus, in at least one embodiment, the techniques herein may be used to obtain a time progressive sequence of images corresponding to the healthy non-error state S1; the intermediate states S1A low, S1B medium and S1C high; and the error state S2. Such images may be used to train a CNN as described herein to recognize when a system is in one of the various intermediate states S1A, S1B and S1C where the CNN may then output a probability or likelihood at a point in time that the system will further transition into the error state S2. Thus, in one aspect, the counter values of the tensors used to generate the images of the intermediate states S1A, S1B, S1C may be characterized a signature of such states.

Figure 13:
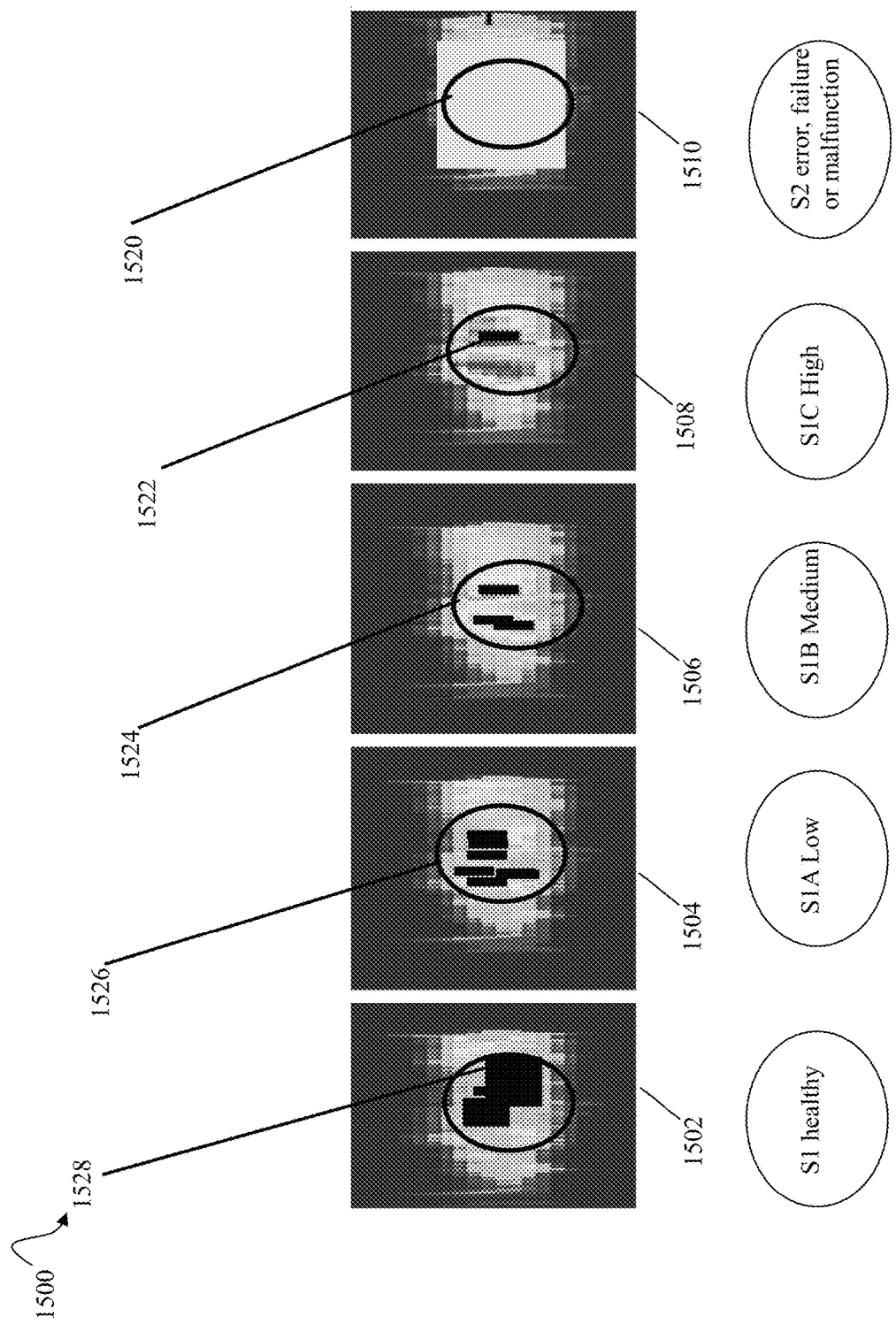

Referring to FIG. 13, shown is an example illustrating images corresponding to the different states of the FIG. 12 in an embodiment in accordance with the techniques herein. The example 1500 includes the image 1502 of the counter values for the code flow tensors when in the healthy state S1. The image 1504 is an image of the counter values for the code flow tensors when in the first intermediate state S1A low. The image 1506 is an image of the counter values for the code flow tensors when in the second intermediate state S1B medium. The image 1508 is an image of the counter values for the code flow tensors when in the third intermediate state S1C high. The image 1510 is an image of the counter values for the code flow tensors when in the error state S2, such as denoting a major failure, error or malfunction state. In connection with the particular images 1502, 1504, 1506, 1508 and 1510, it should be noted that higher counter values are denoted with lighter pixel values. Thus, for example, zero counter values are denoted by black pixels.

As can be seen in the image 1504 corresponding to the state S1A low, the element 1526 denotes a particular area of the image 1504 that has changed in intensity with respect to a corresponding portion 1528 of the image 1502 corresponding to the health state S1.

As can be seen in the image 1506 corresponding to the state S1B medium, the element 1524 denotes a particular area of the image 1506 that has changed in intensity with respect to the corresponding portion 1526 of the image 1504.

As can be seen in the image 1508 corresponding to the state S1C high, the element 1522 denotes a particular area of the image 1508 that has changed in intensity with respect to the corresponding portions 1524 of the image 1506.

As can be seen in the image 1510 corresponding to the state S2, the element 1520 denotes a particular area of the image 1510 that has changed in intensity when compared to the corresponding portion 1522 of the image 1508.

In at least one embodiment described herein, the techniques herein may be used in a data storage system to detect error states as well as other states or events. The states may include a normal state or non-error state as well as various error states. The error states may include various error states that may occur in the data storage system such as, for example, the 2A3C error described elsewhere herein, as well as error states associated with the various physical entities (e.g., PDs) and logical entities (e.g., LUNs, RAID groups) in the data storage system. In such an embodiment, the counters may be incremented along various code paths in software that executes on the data storage system.

More generally, the techniques herein may be used in connection with predicting any event or state of a system or application where the counter values of the code flow tensors denote a signature of the state of the system or application prior to the occurrence of a predicted event.

In at least one embodiment, the techniques herein may be used to facilitate debugging code, such as code of a user application, by selective placement of the counters on various runtime code paths. The counters may be located in code paths associated with a normal or non-error state of the application as well as code paths associated with error conditions or states. As discussed herein, as code of the application is executed at runtime, counters located on such executed code paths may be incremented. When a particular error condition or state occurs, the particular tensors having high counter values may be used to identify the vulnerable or problematic code paths. For example, an error state or condition may be the inability to allocate memory or a cache location. Consistent with discussion herein, a CNN may be trained to predict this error state based on the particular counters having high values as denoted by the image pixels. The code of the application including such counters with the high values may be identified and further examined, for example, as possibly causing the error. In this manner, the techniques herein may also be used to facilitate debugging code of the application.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of predicting states comprising:
receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period;
receiving a plurality of images generated from the plurality of data sets, wherein each of the plurality of data sets is used to generate a different one of the plurality of images;
labeling each of the plurality of images with state information, wherein first state information associated with a first image of the plurality of images indicates that the first image is associated with a first error state of a system or an application;
training a neural network using the plurality of images, wherein said training includes training the neural network to recognize the first error state;
subsequent to said training, receiving a next image generated from another data set including a plurality of counter values each denoting a second number of times a particular code flow point associated with said each counter value is executed at runtime; and
predicting, by the neural network and in accordance with the next image, whether the system or the application is expected to transition into the first error state, and wherein the first state information, that is associated with a first image, includes a time interval denoting a first amount of time prior to the first error state, and wherein the first image is generated from a first data set acquired the first amount of time prior to an occurrence of the first error state in the system or the application.

2. The method of claim 1, further comprising:
providing the next image as an input to the neural network; and
responsive to providing the next image as an input to the neural network, generating by the neural network, a first output value corresponding to a probability indicating a likelihood that the system or the application subsequently transitions into the first error state.

3. The method of claim 2, further comprising:
determining whether the first output value is greater than a threshold; and
responsive to determining the first output value is greater than the threshold, predicting that the system or the application is expected to transition into the first error state, and otherwise predicting that the system or the application is not expected to transition into the first error state.

4. The method of claim 1, wherein the first image is generated from a first of the plurality of data sets and the method further comprises:
receiving the first data set;
waiting a specified amount of time for an occurrence of one of a plurality of defined error states, wherein the first error state is included in the plurality of defined error states;
receiving notification regarding a first occurrence of the first error state at a first point in time, wherein the first data set is acquired the first amount of time prior to the first occurrence of the first error state in the system or the application; and
responsive to said notification, labeling the first data set and the first image with the first state information.

5. The method of claim 1, wherein each of the plurality of images is a gray scale image.

6. The method of claim 1, wherein each of the plurality of images is a color image denoting a heat map of counter values included in a particular one of the plurality of data sets used to generate said each image.

7. The method of claim 1, wherein the system is a data storage system.

8. The method of claim 1, wherein each of the plurality of data sets is acquired at a different point in time.

9. The method of claim 1, wherein the first image is generated from a first data set of the plurality of data sets, wherein the first image is correlated with the first error state and wherein the first image includes pixels representing the plurality of counter values of the first data set.

10. The method of claim 9, wherein the first image is included in a first time sequence of images corresponding to states of the system or the application at different time intervals prior to the system or the application transitioning into the first error state.

11. A method of predicting states comprising:
receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period;
receiving a plurality of images generated from the plurality of data sets, wherein each of the plurality of data sets is used to generate a different one of the plurality of images;
labeling each of the plurality of images with state information, wherein first state information associated with a first image of the plurality of images indicates that the first image is associated with a first error state of a system or an application;
training a neural network using the plurality of images, wherein said training includes training the neural network to recognize the first error state;
subsequent to said training, receiving a next image generated from another data set including a plurality of counter values each denoting a second number of times a particular code flow point associated with said each counter value is executed at runtime; and
predicting, by the neural network and in accordance with the next image, whether the system or the application is expected to transition into the first error state, and wherein the neural network is a first neural network that is assigned an active role at a first point in time, and wherein a second neural network is assigned an idle role at the first point in time, and wherein the active role assigned to the first neural network indicates the assigned first neural network is in a non-learning mode and the first neural network is used to predict a subsequent state of the system or the application based on newly acquired data sets, and wherein the idle role assigned to the second neural network indicates the second neural network is in a learning mode and the newly acquired data sets are used to generate first images used to train the second neural network.

12. The method of claim 11, wherein the second neural network that is assigned the idle role and that is in the learning mode has one or more internal weights adjusted responsive to receiving at least some of the first images as input.

13. The method of claim 12, wherein, at a second point in time subsequent to the first point in time, the first neural network transitions from the active role to the idle role indicating that the first neural network is in the learning mode, and wherein at the second point in time, the second neural network transitions from the idle role to the active role and indicates that the second neural network is in the non-learning mode.

14. The method of claim 13, wherein, subsequent to the second point in time, the second neural network is used to predict a subsequent state of the system or the application based on second newly acquired data sets, and wherein subsequent to the second point in time, the second newly acquired data sets are used to generate second images used to train the first neural network.

15. The method of claim 14, wherein while the first neural network is assigned the idle role and is in the learning mode, the first neural network has one or more internal weights adjusted responsive to receiving at least some of the second images as input.

16. A system comprising:
one or more processors; and
one or more memories comprising code stored thereon that, when executed, performs a method of predicting states comprising:
receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period;
receiving a plurality of matrices generated from the plurality of data sets, wherein each of the plurality of data sets is used to generate a different one of the plurality of matrices;
labeling each of the plurality of matrices with state information, wherein first state information associated with a first matrix of the plurality of matrices indicates that the first matrix is associated with a first error state of a system or an application;
training a neural network using the plurality of matrices, wherein said training includes training the neural network to recognize the first error state;
subsequent to said training, receiving a next matrix generated from another data set including a plurality of counter values each denoting a second number of times a particular code flow point associated with said each counter value is executed at runtime; and
predicting, by the neural network and in accordance with the next matrix, whether the system or the application is expected to transition into the first error state, and wherein the first state information, that is associated with a first image, includes a time interval denoting a first amount of time prior to the first error state, and wherein the first image is generated from a first data set acquired the first amount of time prior to an occurrence of the first error state in the system or the application.

17. A non-transitory computer readable medium comprising code stored thereon that, when executed, performs a method of predicting states comprising:
receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period;
receiving a plurality of images generated from the plurality of data sets, wherein each of the plurality of data sets is used to generate a different one of the plurality of images;
labeling each of the plurality of images with state information, wherein first state information associated with a first image of the plurality of images indicates that the first image is associated with a first error state of a system or an application;
training a neural network using the plurality of images, wherein said training includes training the neural network to recognize the first error state;
subsequent to said training, receiving a next image generated from another data set including a plurality of counter values each denoting a second number of times a particular code flow point associated with said each counter value is executed at runtime; and
predicting, by the neural network and in accordance with the next image, whether the system or the application is expected to transition into the first error state, and wherein the first state information, that is associated with a first image, includes a time interval denoting a first amount of time prior to the first error state, and wherein the first image is generated from a first data set acquired the first amount of time prior to an occurrence of the first error state in the system or the application.

18. A system comprising:
one or more processors; and
one or more memories comprising code stored thereon that, when executed, performs a method of predicting states comprising:
receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period;
receiving a plurality of images generated from the plurality of data sets, wherein each of the plurality of data sets is used to generate a different one of the plurality of images;
labeling each of the plurality of images with state information, wherein first state information associated with a first image of the plurality of images indicates that the first image is associated with a first error state of a system or an application;
training a neural network using the plurality of images, wherein said training includes training the neural network to recognize the first error state;
subsequent to said training, receiving a next image generated from another data set including a plurality of counter values each denoting a second number of times a particular code flow point associated with said each counter value is executed at runtime; and predicting, by the neural network and in accordance with the next image, whether the system or the application is expected to transition into the first error state, and wherein the neural network is a first neural network that is assigned an active role at a first point in time, and wherein a second neural network is assigned an idle role at the first point in time, and wherein the active role assigned to the first neural network indicates the assigned first neural network is in a non-learning mode and the first neural network is used to predict a subsequent state of the system or the application based on newly acquired data sets, and wherein the idle role assigned to the second neural network indicates the second neural network is in a learning mode and the newly acquired data sets are used to generate first images used to train the second neural network.

19. A non-transitory computer readable medium comprising code stored thereon that, when executed, performs a method of predicting states comprising:

receiving a plurality of data sets, wherein each of the plurality of data sets includes a plurality of counter values, wherein each of the plurality of counter values in each of the plurality of data sets denotes a number of times a particular code flow point associated with said each counter value is executed at runtime during a specified time period;

receiving a plurality of images generated from the plurality of data sets, wherein each of the plurality of data sets is used to generate a different one of the plurality of images;

labeling each of the plurality of images with state information, wherein first state information associated with a first image of the plurality of images indicates that the first image is associated with a first error state of a system or an application;

training a neural network using the plurality of images, wherein said training includes training the neural network to recognize the first error state;

subsequent to said training, receiving a next image generated from another data set including a plurality of counter values each denoting a second number of times a particular code flow point associated with said each counter value is executed at runtime; and predicting, by the neural network and in accordance with the next image, whether the system or the application is expected to transition into the first error state, and wherein the neural network is a first neural network that is assigned an active role at a first point in time, and wherein a second neural network is assigned an idle role at the first point in time, and wherein the active role assigned to the first neural network indicates the assigned first neural network is in a non- learning mode and the first neural network is used to predict a subsequent state of the system or the application based on newly acquired data sets, and wherein the idle role assigned to the second neural network indicates the second neural network is in a learning mode and the newly acquired data sets are used to generate first images used to train the second neural network.

* * * * *